United States Patent
Peng et al.

(10) Patent No.: US 12,240,953 B2
(45) Date of Patent: *Mar. 4, 2025

(54) POLYPROPYLENE SHEETS AND ARTICLES

(71) Applicant: Berry Global, Inc., Evansville, IN (US)

(72) Inventors: Yucheng Peng, Evansville, IN (US); Jonathan Eickhoff, Evansville, IN (US); Ryan Dewig, Evansville, IN (US); Jeffrey A. Mann, Evansville, IN (US); Debra R. Wilson, Houston, TX (US)

(73) Assignee: Berry Global, Inc., Evansville, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/399,886

(22) Filed: Dec. 29, 2023

(65) Prior Publication Data

US 2024/0132682 A1 Apr. 25, 2024

Related U.S. Application Data

(63) Continuation of application No. 16/782,165, filed on Feb. 5, 2020, now Pat. No. 11,891,488.

(60) Provisional application No. 62/802,012, filed on Feb. 6, 2019.

(51) Int. Cl.
*C08L 23/12* (2006.01)
*C08J 5/18* (2006.01)
*C08L 23/14* (2006.01)

(52) U.S. Cl.
CPC .............. *C08J 5/18* (2013.01); *C08L 23/12* (2013.01); *C08L 23/14* (2013.01); *C08L 2201/10* (2013.01); *C08L 2205/03* (2013.01)

(58) Field of Classification Search
CPC ...... C08L 2201/10; C08L 23/12; C08L 23/14; C08J 2323/14
See application file for complete search history.

(56) References Cited

U.S. PATENT DOCUMENTS

| | | |
|---|---|---|
| D7,248 S | 3/1874 | Elstrand |
| D53,911 S | 10/1919 | Humphrey |
| D58,571 S | 8/1921 | Hyatt |
| 1,395,594 A | 11/1921 | Pfefferle |
| D62,268 S | 4/1923 | Stern |
| D64,091 S | 2/1924 | Weintraub |
| D65,193 S * | 7/1924 | Leveridge ............ D11/90 |
| 1,624,849 A | 4/1927 | Steele |

(Continued)

FOREIGN PATENT DOCUMENTS

| | | |
|---|---|---|
| CA | 3059250 A1 | 10/2018 |
| CN | 3107990 | 1/1999 |

(Continued)

OTHER PUBLICATIONS

Kocsis et al. The Polypropylene Handbook (Year: 2018).*

(Continued)

*Primary Examiner* — Mark S Kaucher
(74) *Attorney, Agent, or Firm* — Barnes & Thornburg LLP

(57) ABSTRACT

A sheet of polymeric material is made using an extruding process and articles are formed from the sheet of polymeric material. The sheet of polymeric material and the articles comprise one or more polypropylene resins. In some embodiments, the sheet of polymeric material and the articles formed form the sheet of polymeric material are transparent.

18 Claims, 11 Drawing Sheets

(56) References Cited

U.S. PATENT DOCUMENTS

| | | | |
|---|---|---|---|
| D78,805 S | 6/1929 | Burke | |
| 1,755,042 A | 4/1930 | Zoller | |
| 1,773,972 A | 8/1930 | Eberhart | |
| 1,940,088 A | 12/1933 | Harrison | |
| 2,015,028 A | 9/1935 | Gillette | |
| 2,050,487 A | 8/1936 | Durrant | |
| 2,120,403 A | 6/1938 | Godfrey | |
| D111,097 S | 8/1938 | White | |
| 2,174,618 A | 10/1939 | Burdick | |
| 2,271,589 A | 2/1942 | Hendrickson | |
| 2,313,801 A | 3/1943 | Carll | |
| 2,374,092 A | 4/1945 | Glaser | |
| D141,225 S | 5/1945 | Ray | |
| 2,447,407 A | 8/1948 | Grain | |
| 2,649,984 A | 8/1953 | Abt | |
| D172,089 S | 5/1954 | Pree | |
| 2,766,796 A | 10/1956 | Tupper | |
| 2,985,354 A | 5/1961 | Aldington | |
| 3,027,596 A | 4/1962 | Knowles | |
| 3,048,317 A | 8/1962 | Cochrane | |
| 3,055,540 A | 9/1962 | Ringlen | |
| 3,065,875 A | 11/1962 | Negoro | |
| 3,071,281 A | 1/1963 | Sawai | |
| 3,103,224 A | 9/1963 | Dearling | |
| 3,128,903 A | 4/1964 | Crisci | |
| 3,245,691 A | 4/1966 | Gorman | |
| 3,262,602 A | 7/1966 | McConnell | |
| 3,269,734 A | 8/1966 | Ottofy | |
| 3,301,459 A | 1/1967 | Gardner | |
| 3,329,304 A | 7/1967 | Crisci | |
| 3,329,305 A | 7/1967 | Crisci | |
| 3,349,950 A | 10/1967 | Wanderer | |
| 3,392,468 A | 7/1968 | Wolf | |
| 3,421,653 A | 1/1969 | Whaley | |
| 3,433,378 A | 3/1969 | Ross | |
| 3,502,765 A | 3/1970 | Spencer | |
| 3,524,566 A | 8/1970 | Parks | |
| 3,561,668 A | 2/1971 | Bergstrom | |
| 3,583,596 A | 6/1971 | Brewer | |
| D221,420 S | 8/1971 | Davis | |
| 3,604,588 A | 9/1971 | Winnick | |
| 3,609,263 A | 9/1971 | Clementi | |
| 3,610,306 A | 10/1971 | Summers | |
| 3,612,342 A | 10/1971 | Bun | |
| 3,624,787 A | 11/1971 | Newman | |
| D222,905 S | 2/1972 | Kinney | |
| 3,676,089 A | 7/1972 | Swett | |
| 3,677,435 A | 7/1972 | Davis | |
| 3,679,088 A | 7/1972 | Swett | |
| 3,679,089 A | 7/1972 | Swett | |
| D226,063 S | 1/1973 | Warnberg | |
| 3,734,276 A | 5/1973 | Bank | |
| 3,743,133 A | 7/1973 | Rathbun | |
| 3,745,055 A | 7/1973 | Gorman | |
| 3,746,158 A | 7/1973 | Connick | |
| 3,752,042 A | 8/1973 | Castille | |
| 3,768,688 A | 10/1973 | Linke | |
| 3,789,095 A | 1/1974 | Winstead | |
| 3,805,991 A | 4/1974 | Cheladze | |
| 3,817,420 A | 6/1974 | Heisler | |
| 3,828,637 A | 8/1974 | Slack | |
| 3,840,144 A | 10/1974 | Dry | |
| D233,599 S | 11/1974 | Davis | |
| 3,926,084 A | 12/1975 | Blazer | |
| RE28,797 E | 5/1976 | Brewer | |
| 3,954,923 A | 5/1976 | Valyi | |
| 3,974,916 A | 8/1976 | Bartolucci | |
| 3,977,563 A | 8/1976 | Holt | |
| 3,994,411 A | 11/1976 | Elfelt | |
| D242,736 S | 12/1976 | Craft, III | |
| D242,738 S * | 12/1976 | Michaeli | D26/136 |
| 4,006,839 A | 2/1977 | Thiel | |
| 4,007,936 A | 2/1977 | Hornsby | |
| 4,018,355 A | 4/1977 | Ando | |
| 4,026,459 A | 5/1977 | Blanchard | |
| 4,054,229 A | 10/1977 | Arfert | |
| 4,061,706 A | 12/1977 | Duffield | |
| D246,955 S | 1/1978 | Davis | |
| 4,074,827 A | 2/1978 | Labe | |
| 4,078,686 A | 3/1978 | Karesh | |
| D248,376 S | 7/1978 | Allen | |
| D251,828 S | 5/1979 | Smith | |
| 4,190,174 A | 2/1980 | Haimowitz | |
| 4,194,645 A | 3/1980 | Zabner | |
| 4,210,258 A | 7/1980 | Von Holdt | |
| 4,211,743 A | 7/1980 | Nauta et al. | |
| D256,558 S | 8/1980 | Smith | |
| D258,576 S | 3/1981 | Smith | |
| 4,266,689 A | 5/1981 | Asher | |
| D261,486 S * | 10/1981 | Smith | D9/452 |
| 4,293,080 A | 10/1981 | Letica | |
| D262,691 S | 1/1982 | Horsley | |
| D264,440 S * | 5/1982 | Austin | D9/431 |
| D264,690 S | 6/1982 | Bagwell | |
| 4,349,119 A | 9/1982 | Letica | |
| 4,351,448 A | 9/1982 | Ingersoll | |
| 4,370,908 A | 2/1983 | Dealto | |
| 4,380,305 A | 4/1983 | Von Holdt | |
| 4,389,802 A | 6/1983 | McLaren | |
| 4,408,698 A | 10/1983 | Ballester | |
| 4,412,467 A | 11/1983 | Desanto | |
| 4,413,964 A | 11/1983 | Winstead | |
| D271,857 S | 12/1983 | Callahan | |
| 4,421,244 A | 12/1983 | Van Melle | |
| 4,421,712 A | 12/1983 | Winstead | |
| D272,324 S | 1/1984 | Mumford | |
| 4,444,332 A | 4/1984 | Widen | |
| 4,446,986 A | 5/1984 | Bowen | |
| 4,474,305 A | 10/1984 | Marco | |
| 4,508,235 A | 4/1985 | Steele | |
| 4,518,097 A | 5/1985 | Milton | |
| 4,524,882 A | 6/1985 | Buc | |
| 4,562,937 A | 1/1986 | Iyengar | |
| D286,026 S | 10/1986 | Rayner | |
| 4,629,088 A | 12/1986 | Durgin | |
| 4,640,434 A | 2/1987 | Johnsen | |
| 4,640,435 A | 2/1987 | Dutt | |
| 4,674,644 A | 6/1987 | Jacobs | |
| 4,679,699 A | 7/1987 | Malsbury | |
| D292,380 S | 10/1987 | Smith | |
| 4,721,210 A | 1/1988 | Lawrence | |
| 4,722,820 A | 2/1988 | Flecknoe-Brown | |
| 4,782,976 A | 11/1988 | Kenyon | |
| D298,919 S | 12/1988 | Gee | |
| 4,799,602 A | 1/1989 | Collins | |
| 4,836,407 A | 6/1989 | Bruce | |
| 4,872,586 A | 10/1989 | Landis | |
| 4,886,184 A | 12/1989 | Chamourian | |
| 4,934,557 A | 6/1990 | Smith | |
| D309,564 S | 7/1990 | Rayner | |
| 4,971,211 A | 11/1990 | Lake | |
| 4,994,229 A | 2/1991 | Flecknoe-Brown | |
| D317,262 S | 6/1991 | Bluff | |
| 5,064,082 A | 11/1991 | Lombardi | |
| 5,088,367 A | 2/1992 | Cracchiolo | |
| 5,099,232 A | 3/1992 | Howes | |
| 5,106,567 A | 4/1992 | Demerest | |
| 5,111,961 A | 5/1992 | Van Melle | |
| 5,151,233 A | 9/1992 | Wendt | |
| 5,180,079 A | 1/1993 | Jeng | |
| 5,188,691 A | 2/1993 | Caputo | |
| 5,197,624 A | 3/1993 | Dodaro | |
| 5,219,627 A | 6/1993 | Arase | |
| D339,027 S | 9/1993 | Mack | |
| 5,375,828 A | 12/1994 | Shikami | |
| 5,377,860 A | 1/1995 | Littlejohn | |
| 5,390,810 A | 2/1995 | Stroble | |
| 5,397,023 A | 3/1995 | Toczek | |
| 5,398,843 A | 3/1995 | Warden | |
| 5,427,266 A | 6/1995 | Yun | |
| D360,133 S | 7/1995 | Boller | |
| 5,460,286 A | 10/1995 | Rush | |
| D365,516 S * | 12/1995 | Williamson | D9/651 |
| 5,489,026 A | 2/1996 | Daloia | |

(56) References Cited

U.S. PATENT DOCUMENTS

| | | |
|---|---|---|
| D368,430 S | 4/1996 | Herzog |
| D368,444 S * | 4/1996 | Shryock .................. D11/143 |
| 5,503,289 A | 4/1996 | Fox |
| 5,509,568 A | 4/1996 | Warden |
| 5,524,788 A | 6/1996 | Plester |
| 5,531,347 A | 7/1996 | Goulding |
| 5,542,532 A | 8/1996 | Mitchell |
| D374,822 S | 10/1996 | Philips |
| 5,592,766 A | 1/1997 | Mygatt |
| 5,613,619 A | 3/1997 | Van Melle |
| 5,614,228 A | 3/1997 | Demerest |
| 5,641,063 A | 6/1997 | Gambardella |
| D380,385 S | 7/1997 | Litke |
| D381,267 S | 7/1997 | Rush |
| D384,580 S | 10/1997 | Fernandes |
| D384,862 S * | 10/1997 | Hayes ..................... D7/566 |
| 5,713,463 A | 2/1998 | Lakoski |
| 5,722,558 A | 3/1998 | Thompson |
| 5,746,312 A | 5/1998 | Johnson |
| 5,769,263 A | 6/1998 | Willingham |
| 5,775,194 A | 7/1998 | Spada |
| 5,783,229 A | 7/1998 | Manlove |
| 5,791,509 A | 8/1998 | Rush |
| 5,795,535 A | 8/1998 | Giovannone |
| D398,997 S | 9/1998 | Taylor |
| 5,806,707 A | 9/1998 | Boehm |
| 5,820,016 A | 10/1998 | Stropkay |
| 5,829,583 A | 11/1998 | Verweyst |
| 5,839,601 A | 11/1998 | Melle |
| 5,868,309 A | 2/1999 | Sandstrom |
| D408,223 S | 4/1999 | Henry |
| 5,894,952 A | 4/1999 | Mendenhall |
| 5,913,964 A | 6/1999 | Melton |
| 5,947,278 A | 9/1999 | Sawhney |
| 5,947,323 A | 9/1999 | Freek |
| 5,979,690 A | 11/1999 | Hartley |
| 5,983,693 A | 11/1999 | Bodnar |
| 6,021,917 A | 2/2000 | Lovell |
| 6,056,144 A | 5/2000 | Strange |
| 6,070,752 A | 6/2000 | Nava |
| D428,355 S * | 7/2000 | Kavalek .................. D11/90 |
| 6,086,800 A | 7/2000 | Manlove |
| 6,089,397 A | 7/2000 | Van Melle |
| D432,868 S * | 10/2000 | Tan ....................... D7/584 |
| 6,126,035 A | 10/2000 | Schaper |
| 6,161,354 A | 12/2000 | Gilbert |
| D437,223 S | 2/2001 | Coy |
| D437,671 S | 2/2001 | Fajerstein |
| 6,196,404 B1 | 3/2001 | Chen |
| 6,196,411 B1 | 3/2001 | Nava |
| 6,216,857 B1 | 4/2001 | Gordon |
| 6,257,435 B1 | 7/2001 | Chedister |
| 6,257,629 B1 | 7/2001 | Weichelt |
| D446,150 S * | 8/2001 | Bamminger .............. D11/90 |
| 6,279,300 B1 | 8/2001 | Simhaee |
| 6,299,014 B1 | 10/2001 | Nava |
| 6,302,288 B1 | 10/2001 | Nava |
| 6,311,860 B1 | 11/2001 | Reidinger |
| 6,319,456 B1 | 11/2001 | Gilbert |
| D452,155 S | 12/2001 | Stodd |
| 6,330,943 B1 | 12/2001 | Gordon |
| 6,349,821 B1 | 2/2002 | Gordon |
| 6,357,619 B1 | 3/2002 | Schaefer |
| 6,364,102 B1 | 4/2002 | Gordon |
| 6,371,289 B1 | 4/2002 | Gordon |
| 6,394,783 B1 | 5/2002 | Dalgewicz, III |
| 6,404,730 B2 | 6/2002 | Yeo |
| 6,412,629 B1 | 7/2002 | Gordon |
| 6,419,112 B1 | 7/2002 | Bruce |
| D461,141 S | 8/2002 | Steiner |
| 6,427,832 B1 | 8/2002 | Ali |
| 6,454,087 B2 | 9/2002 | Gordon |
| 6,460,716 B1 | 10/2002 | Wong |
| 6,464,072 B2 | 10/2002 | Gordon |
| 6,478,148 B2 | 11/2002 | Gordon |
| 6,481,573 B2 | 11/2002 | Gordon |
| D468,494 S | 1/2003 | Holloway |
| D469,693 S | 2/2003 | Weiss |
| D471,810 S | 3/2003 | Hayes |
| 6,533,114 B1 | 3/2003 | Gordon |
| 6,554,154 B1 | 4/2003 | Chauhan |
| 6,557,698 B2 | 5/2003 | Gordon |
| 6,561,122 B1 | 5/2003 | Kurja |
| 6,561,345 B2 | 5/2003 | Gordon |
| 6,571,943 B2 | 6/2003 | Gordon |
| 6,576,309 B2 | 6/2003 | Dalgewicz, III |
| 6,588,182 B2 | 7/2003 | Gordon |
| 6,598,741 B2 | 7/2003 | Gordon |
| 6,604,629 B2 | 8/2003 | Gordon |
| 6,612,456 B1 | 9/2003 | Hundley |
| 6,625,959 B2 | 9/2003 | Gordon |
| 6,626,288 B2 | 9/2003 | Gordon |
| D480,968 S | 10/2003 | Atkins |
| 6,641,384 B2 | 11/2003 | Bosler |
| 6,647,696 B2 | 11/2003 | Gordon |
| 6,648,134 B2 | 11/2003 | Gordon |
| D482,985 S | 12/2003 | Bombeke |
| 6,688,487 B2 | 2/2004 | Oakes |
| D487,411 S * | 3/2004 | Bamminger .............. D11/90 |
| 6,737,008 B2 | 5/2004 | Gilbert |
| D492,901 S * | 7/2004 | Woods ................... D9/435 |
| 6,814,905 B1 | 11/2004 | Dalgewicz |
| 6,840,375 B2 | 1/2005 | Gordon |
| 6,846,533 B2 | 1/2005 | Wu |
| D502,050 S | 2/2005 | Munson |
| 6,874,649 B2 | 4/2005 | Clarke |
| 6,886,707 B2 | 5/2005 | Giraud |
| 6,889,860 B2 | 5/2005 | Mazzarolo |
| 6,907,702 B2 | 6/2005 | Gilbert |
| 6,910,599 B2 | 6/2005 | Tucker |
| 6,923,338 B2 | 8/2005 | Dees |
| 6,929,143 B2 | 8/2005 | Mazzarolo |
| 6,932,234 B2 | 8/2005 | Damato |
| 6,948,633 B2 | 9/2005 | Freek |
| 6,959,829 B2 | 11/2005 | Crider |
| 7,000,522 B2 | 2/2006 | Pfaff, Jr. |
| D516,910 S | 3/2006 | Bresler |
| D517,322 S | 3/2006 | Zettle |
| 7,017,774 B2 | 3/2006 | Haedt |
| D519,374 S | 4/2006 | Hornke |
| D521,382 S | 5/2006 | Gross |
| D522,240 S | 6/2006 | Laval |
| 7,055,715 B2 | 6/2006 | Maravich |
| 7,063,224 B2 | 6/2006 | Clarke |
| D525,869 S | 8/2006 | Tedford, Jr. |
| D527,261 S | 8/2006 | Manfred |
| 7,100,787 B2 | 9/2006 | Farnsworth |
| 7,108,495 B2 | 9/2006 | Gilbert |
| D529,391 S | 10/2006 | Glass |
| D533,777 S | 12/2006 | Hundley |
| 7,144,619 B2 | 12/2006 | Ramchandra |
| 7,156,251 B2 | 1/2007 | Smith |
| 7,157,034 B2 | 1/2007 | Bristow |
| 7,159,732 B2 | 1/2007 | Smith |
| 7,169,855 B2 | 1/2007 | Yamaguchi |
| 7,175,042 B2 | 2/2007 | Durdon |
| 7,213,709 B2 | 5/2007 | Moskovich |
| D543,787 S | 6/2007 | Wasserman |
| 7,225,945 B2 | 6/2007 | Crider |
| 7,232,302 B2 | 6/2007 | Marzona |
| 7,246,714 B2 | 7/2007 | Garg |
| 7,255,391 B2 | 8/2007 | Bristow |
| 7,284,673 B2 | 10/2007 | Habeger |
| 7,284,676 B2 | 10/2007 | Dantani |
| D556,037 S * | 11/2007 | D'Amato ................. D9/454 |
| D556,574 S | 12/2007 | Hollis |
| D559,105 S * | 1/2008 | D'Amato ................. D9/454 |
| D560,120 S | 1/2008 | Maravich |
| 7,318,536 B2 | 1/2008 | Maravich |
| 7,318,563 B2 | 1/2008 | Houts |
| 7,328,791 B1 | 2/2008 | Bosworth |
| D564,354 S | 3/2008 | Maravich |
| 7,353,582 B2 | 4/2008 | Mackenzie |
| D569,245 S | 5/2008 | Joshi |

(56) References Cited

U.S. PATENT DOCUMENTS

| | | |
|---|---|---|
| D570,685 S | 6/2008 | Koennecke |
| D570,686 S | 6/2008 | Hollis |
| D572,587 S | 7/2008 | Rush |
| D574,231 S | 8/2008 | Laval |
| D574,238 S | 8/2008 | Walker, III |
| D574,290 S | 8/2008 | Shah |
| 7,413,698 B2 | 8/2008 | Bearse |
| D578,829 S | 10/2008 | Freeman |
| 7,455,006 B2 | 11/2008 | Toth |
| 7,464,831 B2 | 12/2008 | Aiken |
| 7,484,639 B2 | 2/2009 | Maravich |
| D588,002 S * | 3/2009 | D'Amato ............... D9/454 |
| 7,513,382 B2 | 4/2009 | Clarke |
| 7,523,534 B2 | 4/2009 | Mackenzie |
| D591,476 S | 5/2009 | Colman |
| D592,952 S | 5/2009 | Hundley |
| D593,892 S | 6/2009 | Schneider |
| 7,549,559 B2 | 6/2009 | Conroy |
| D596,524 S | 7/2009 | Schneider |
| 7,591,389 B2 | 9/2009 | Wong |
| 7,611,660 B2 | 11/2009 | Bosler |
| 7,624,536 B2 | 12/2009 | Schromm |
| 7,628,946 B2 | 12/2009 | Gandon |
| 7,642,316 B2 | 1/2010 | Rego |
| 7,658,296 B2 | 2/2010 | Van Handel |
| 7,658,882 B2 | 2/2010 | Minganti |
| 7,676,909 B2 | 3/2010 | Mackenzie |
| 7,685,677 B2 | 3/2010 | Garg |
| D613,199 S * | 4/2010 | Schneider ............... D11/90 |
| 7,691,302 B2 | 4/2010 | Hollis |
| D614,954 S | 5/2010 | Crowell |
| 7,754,299 B2 | 7/2010 | Wu |
| 7,762,213 B2 | 7/2010 | Cook |
| 7,784,641 B2 | 8/2010 | Chou |
| D624,413 S | 9/2010 | Selina |
| 7,819,271 B2 | 10/2010 | Hollis |
| 7,837,923 B2 | 11/2010 | Bearse |
| 7,845,510 B2 | 12/2010 | Schmidtner |
| 7,845,514 B2 | 12/2010 | Rush |
| 7,850,812 B2 | 12/2010 | Sekar |
| 7,866,502 B2 | 1/2011 | Maxwell |
| 7,874,449 B1 | 1/2011 | Studee |
| 7,992,741 B2 | 8/2011 | Hundley |
| 7,997,230 B2 | 8/2011 | Cook |
| 8,007,269 B1 | 8/2011 | Otto |
| 8,038,432 B2 | 10/2011 | Mazzarolo |
| 8,074,331 B2 | 12/2011 | Voges |
| 8,074,831 B2 | 12/2011 | Walker |
| 8,084,109 B2 | 12/2011 | Gao |
| 8,113,379 B2 | 2/2012 | Cai |
| 8,142,587 B2 | 3/2012 | Sekar |
| 8,142,599 B2 | 3/2012 | Sekar |
| 8,152,018 B2 | 4/2012 | Smith |
| 8,196,500 B2 | 6/2012 | Mansfield |
| 8,211,355 B2 | 7/2012 | Otto |
| 8,276,776 B2 | 10/2012 | Roth |
| 8,282,382 B2 | 10/2012 | Mazzarolo |
| 8,286,823 B2 | 10/2012 | Turvey |
| 8,287,270 B2 | 10/2012 | Lee |
| 8,308,884 B2 | 11/2012 | Sekar |
| 8,312,993 B2 | 11/2012 | Sams |
| 8,317,050 B2 | 11/2012 | Hollis |
| 8,348,053 B2 | 1/2013 | Bellamah |
| 8,418,871 B1 | 4/2013 | Lamasney |
| 8,430,268 B2 | 4/2013 | Weiss |
| D685,286 S * | 7/2013 | Bhansali ............... D11/90 |
| 8,474,643 B2 | 7/2013 | Hundley |
| 8,486,211 B2 | 7/2013 | Sekar |
| 8,499,947 B2 | 8/2013 | Trost |
| 8,544,677 B2 | 10/2013 | Selina |
| D693,181 S | 11/2013 | Chase |
| D694,109 S | 11/2013 | Tanner |
| 8,573,400 B1 | 11/2013 | Lamasney |
| 8,592,014 B2 | 11/2013 | Alvarez |
| D695,612 S | 12/2013 | Chou |
| 8,616,405 B2 | 12/2013 | French |
| D696,940 S | 1/2014 | Hale |
| 8,623,261 B2 | 1/2014 | Patkar |
| 8,628,319 B2 | 1/2014 | Mazzarolo |
| 8,628,718 B2 | 1/2014 | Li |
| 8,632,831 B2 | 1/2014 | Perry |
| D699,619 S | 2/2014 | Kothari |
| 8,642,102 B2 | 2/2014 | Field |
| D700,513 S * | 3/2014 | Carsrud ............... D9/447 |
| 8,662,880 B2 | 3/2014 | Fowler |
| 8,753,106 B2 | 6/2014 | Lee |
| 8,764,928 B2 | 7/2014 | Sekar |
| 8,771,451 B2 | 7/2014 | Sekar |
| 8,777,013 B1 | 7/2014 | Jalindre |
| 8,777,046 B2 | 7/2014 | Mann |
| 8,800,801 B2 | 8/2014 | Freeman |
| 8,895,092 B1 | 11/2014 | Field |
| 8,939,312 B1 | 1/2015 | Buck |
| D722,873 S | 2/2015 | Wu |
| 8,950,623 B2 | 2/2015 | Fleming |
| D726,025 S | 4/2015 | Somers |
| 9,034,231 B2 | 5/2015 | Tabor |
| D732,959 S * | 6/2015 | Branstad ............... D9/454 |
| 9,051,106 B2 | 6/2015 | Milano |
| D734,894 S * | 7/2015 | Schlatter ............... D9/559 |
| 9,078,535 B1 | 7/2015 | Buck |
| 9,102,446 B2 | 8/2015 | Kowal |
| 9,114,902 B2 | 8/2015 | Temple, Jr. |
| D737,689 S | 9/2015 | Monteparo |
| 9,144,464 B2 | 9/2015 | Knowlton |
| 9,156,950 B2 | 10/2015 | Garralda |
| D744,288 S * | 12/2015 | Rosen ............... D7/584 |
| 9,199,776 B1 | 12/2015 | Bruce |
| D746,682 S * | 1/2016 | Trombetta ............... D9/454 |
| D751,382 S | 3/2016 | Torrison |
| 9,278,787 B2 | 3/2016 | Garg |
| 9,352,886 B2 | 5/2016 | Baillies |
| D761,104 S | 7/2016 | Buck |
| 9,421,710 B2 | 8/2016 | Drebes |
| 9,474,420 B2 | 10/2016 | Oakes |
| 9,526,362 B2 | 12/2016 | Wang |
| 9,546,018 B1 | 1/2017 | Vovan |
| 9,561,885 B1 | 2/2017 | Studee |
| 9,656,418 B2 | 5/2017 | Kezios |
| 9,669,992 B2 | 6/2017 | Temple, Jr. |
| D793,231 S * | 8/2017 | Langfelder ............... D9/449 |
| D793,899 S | 8/2017 | Tilbrook |
| 9,717,651 B2 | 8/2017 | Hohl |
| 9,814,334 B2 | 11/2017 | Eickhoff |
| 9,815,239 B2 | 11/2017 | Borse |
| 10,113,058 B2 | 10/2018 | Bockman |
| D838,590 S | 1/2019 | Lee |
| D838,591 S * | 1/2019 | Lee ............... D7/396.2 |
| 10,201,241 B2 | 2/2019 | Eickhoff |
| D845,128 S * | 4/2019 | Eickhoff ............... D9/453 |
| 10,286,593 B2 | 5/2019 | Topolkaraev |
| D850,260 S * | 6/2019 | Eickhoff ............... D9/452 |
| D867,873 S | 11/2019 | Troudt |
| D876,233 S | 2/2020 | Pan |
| 10,570,263 B2 | 2/2020 | Wallis |
| 10,577,159 B2 * | 3/2020 | Peng ............... B65D 43/0208 |
| D885,911 S * | 6/2020 | Silva ............... D9/456 |
| D885,912 S * | 6/2020 | Silva ............... D9/456 |
| D907,997 S * | 1/2021 | Eickhoff ............... D9/434 |
| D911,168 S * | 2/2021 | Eickhoff ............... D9/434 |
| 11,014,722 B2 * | 5/2021 | Peng ............... A47G 19/2272 |
| 11,040,499 B2 * | 6/2021 | Eickhoff ............... B29C 69/001 |
| D930,476 S | 9/2021 | Bontrager |
| D944,083 S | 2/2022 | Boggs |
| D945,264 S * | 3/2022 | Eickhoff ............... D9/449 |
| D953,161 S | 5/2022 | Tang |
| D955,160 S | 6/2022 | Liu |
| 11,433,591 B2 * | 9/2022 | Eickhoff ............... B29C 51/44 |
| D976,105 S * | 1/2023 | Eickhoff ............... D9/436 |
| 11,548,701 B2 * | 1/2023 | Peng ............... A47G 19/2272 |
| D984,894 S * | 5/2023 | Eickhoff ............... D9/434 |
| D993,770 S * | 8/2023 | Eickhoff ............... D9/454 |
| D993,771 S * | 8/2023 | Eickhoff ............... D9/454 |
| 11,891,488 B2 * | 2/2024 | Peng ............... C08J 5/18 |

(56) References Cited

U.S. PATENT DOCUMENTS

| | | |
|---|---|---|
| 2001/0001376 A1 | 5/2001 | Kneppe |
| 2002/0027139 A1 | 3/2002 | Oneill |
| 2002/0037378 A1 | 3/2002 | Littlejohn |
| 2002/0184985 A1 | 12/2002 | Ishibuchi |
| 2002/0189957 A1 | 12/2002 | Gordon |
| 2003/0062272 A1 | 4/2003 | Gordon |
| 2003/0089714 A1 | 5/2003 | Dart |
| 2003/0089726 A1 | 5/2003 | Mazzarolo |
| 2003/0114288 A1 | 6/2003 | Harding |
| 2003/0155353 A1 | 8/2003 | Tucker |
| 2003/0170460 A1 | 9/2003 | Sienkiewicz |
| 2003/0192890 A1 | 10/2003 | Mazzarolo |
| 2004/0011803 A1 | 1/2004 | Damato |
| 2004/0094553 A1 | 5/2004 | Crider |
| 2004/0101703 A1 | 5/2004 | Funaki |
| 2004/0134911 A1 | 7/2004 | Padovani |
| 2004/0144676 A1 | 7/2004 | Rider |
| 2004/0159080 A1 | 8/2004 | Stewart |
| 2004/0178199 A1 | 9/2004 | Stroup |
| 2004/0217033 A1 | 11/2004 | Gordon |
| 2004/0222226 A1 | 11/2004 | Gottainer |
| 2004/0245261 A1 | 12/2004 | Stanos |
| 2005/0037168 A1 | 2/2005 | Dalgewicz |
| 2005/0051442 A1 | 3/2005 | Gordon |
| 2005/0082177 A1 | 4/2005 | Weiss |
| 2005/0092749 A1 | 5/2005 | Durdon |
| 2005/0109780 A1 | 5/2005 | Pendergrass |
| 2005/0155969 A1 | 7/2005 | Clarke |
| 2005/0167294 A1 | 8/2005 | Swayne |
| 2005/0178766 A1 | 8/2005 | Washington |
| 2005/0210085 A1 | 9/2005 | Bessiere |
| 2005/0224505 A1 | 10/2005 | Brown |
| 2005/0230406 A1 | 10/2005 | Maravich |
| 2005/0263413 A1 | 12/2005 | Harman |
| 2005/0269328 A1 | 12/2005 | Crider |
| 2006/0071008 A1 | 4/2006 | Sadlier |
| 2006/0060589 A1 | 5/2006 | Lee |
| 2006/0096983 A1 | 5/2006 | Patterson |
| 2006/0097516 A1* | 5/2006 | Kozlowski ............ G09F 3/0291 283/117 |
| 2006/0180028 A1 | 8/2006 | Burchard |
| 2006/0213908 A1 | 9/2006 | Clarke |
| 2006/0226148 A1 | 10/2006 | Hundley |
| 2006/0255038 A1 | 11/2006 | Hollis |
| 2007/0007298 A1 | 1/2007 | Tucker |
| 2007/0034629 A1 | 2/2007 | Mazzarolo |
| 2007/0062943 A1 | 3/2007 | Bosworth |
| 2007/0075080 A1 | 4/2007 | Farnsworth |
| 2007/0107578 A1 | 5/2007 | Koelsch |
| 2007/0246862 A1 | 10/2007 | Jones |
| 2008/0035681 A1 | 2/2008 | Skillin |
| 2008/0097516 A1 | 4/2008 | Chang |
| 2008/0105696 A1 | 5/2008 | Dart |
| 2008/0197134 A1 | 8/2008 | Maxwell |
| 2008/0230176 A1 | 9/2008 | Van De Weijer |
| 2008/0245792 A1 | 10/2008 | Chou |
| 2009/0026219 A1 | 1/2009 | Bal |
| 2009/0223961 A1 | 9/2009 | Wang |
| 2009/0266829 A1 | 10/2009 | Bailey |
| 2009/0272742 A1 | 11/2009 | Dybala |
| 2009/0308882 A1 | 12/2009 | Hundley |
| 2009/0313956 A1 | 12/2009 | Martinez Sampedro |
| 2010/0037780 A1 | 2/2010 | Pas |
| 2010/0255137 A1 | 10/2010 | Mazzarolo |
| 2010/0282400 A1 | 11/2010 | Sekar |
| 2011/0011863 A1 | 1/2011 | Hollis |
| 2011/0062173 A1 | 3/2011 | Trotter |
| 2011/0089187 A1 | 4/2011 | Steiger |
| 2011/0124817 A1 | 5/2011 | Dias |
| 2011/0272318 A1 | 11/2011 | Gallop |
| 2011/0284564 A1 | 11/2011 | Hsieh |
| 2011/0297573 A1 | 12/2011 | Chen |
| 2012/0024871 A1 | 2/2012 | Hundley |
| 2012/0048856 A1 | 3/2012 | Walker |
| 2012/0097690 A1 | 4/2012 | Chien |
| 2012/0113488 A1 | 5/2012 | Machida |
| 2012/0132699 A1 | 5/2012 | Mann |
| 2012/0208961 A1* | 8/2012 | Carnahan ................ C08L 23/10 525/88 |
| 2012/0261417 A1 | 10/2012 | Tabor |
| 2012/0272622 A1 | 11/2012 | Weiss |
| 2012/0298032 A1 | 11/2012 | Mazzarolo |
| 2013/0020338 A1 | 1/2013 | French |
| 2013/0037558 A1 | 2/2013 | Selina |
| 2013/0142975 A1 | 6/2013 | Wallace |
| 2013/0277380 A1 | 10/2013 | Koestring |
| 2014/0072674 A1 | 3/2014 | Holinda, Jr. |
| 2014/0224805 A1 | 8/2014 | Merbach |
| 2014/0238583 A1 | 8/2014 | Sekar |
| 2014/0238584 A1 | 8/2014 | Sekar |
| 2014/0263378 A1 | 9/2014 | Bolek |
| 2014/0284344 A1 | 9/2014 | French |
| 2014/0325715 A1 | 10/2014 | Wendeln |
| 2015/0014090 A1* | 1/2015 | Masor .................... G10K 11/18 181/211 |
| 2015/0021345 A1 | 1/2015 | Wu |
| 2015/0094406 A1 | 4/2015 | Miley |
| 2015/0191282 A1 | 7/2015 | Crudgington |
| 2015/0216342 A1 | 8/2015 | Tabor |
| 2015/0251818 A1 | 9/2015 | Strachan |
| 2015/0337059 A1 | 11/2015 | Guylaine |
| 2015/0344647 A1 | 12/2015 | Maeda |
| 2015/0367566 A1 | 12/2015 | Schwab |
| 2016/0000243 A1 | 1/2016 | Tedford, Jr. |
| 2016/0000269 A1 | 1/2016 | Van Puijenbroek |
| 2016/0016389 A1* | 1/2016 | Dias ........................ B32B 1/00 428/213 |
| 2016/0016702 A1 | 1/2016 | Siskindovich |
| 2016/0058223 A1 | 3/2016 | Savenok |
| 2016/0075487 A1 | 3/2016 | Lin |
| 2016/0081280 A1 | 3/2016 | Moore |
| 2016/0090218 A1 | 3/2016 | Sun |
| 2016/0107786 A1 | 4/2016 | Lin |
| 2016/0113424 A1 | 4/2016 | Eickhoff |
| 2016/0137364 A1 | 5/2016 | Pirrella |
| 2016/0160004 A1 | 6/2016 | Skaggs |
| 2016/0167855 A1 | 6/2016 | Umbarger |
| 2016/0318686 A1 | 11/2016 | Russell |
| 2016/0355327 A1 | 12/2016 | Minganti |
| 2017/0008187 A1 | 1/2017 | Iwai |
| 2017/0029189 A1 | 2/2017 | Sanders |
| 2017/0043913 A1 | 2/2017 | Strachan |
| 2017/0121089 A1 | 5/2017 | Gillblad |
| 2017/0137159 A1 | 5/2017 | Sullivan |
| 2018/0022012 A1 | 1/2018 | Rapparini |
| 2018/0050826 A1 | 2/2018 | Hartman |
| 2018/0127161 A1 | 5/2018 | Smith |
| 2018/0133919 A1 | 5/2018 | Waterman |
| 2018/0290798 A1* | 10/2018 | Peng .................. B65D 43/0208 |
| 2019/0039328 A1* | 2/2019 | Eickhoff ................. B29C 69/02 |
| 2020/0024039 A1 | 1/2020 | Chou |
| 2020/0029712 A1 | 1/2020 | O'Nan |
| 2020/0055640 A1 | 2/2020 | Lee |
| 2020/0247034 A1* | 8/2020 | Eickhoff ................ B29C 51/268 |
| 2020/0247967 A1* | 8/2020 | Peng ......................... C08J 5/18 |
| 2021/0047083 A1 | 2/2021 | Eickhoff |
| 2021/0253318 A1* | 8/2021 | Waterman ............ B65D 51/245 |
| 2022/0041341 A1 | 2/2022 | Eickhoff |
| 2022/0097925 A1 | 3/2022 | Baird |
| 2023/0105117 A1* | 4/2023 | Waterman ......... B29C 49/42412 264/603 |

FOREIGN PATENT DOCUMENTS

| | | |
|---|---|---|
| CN | 99813627 | 1/1999 |
| CN | 99813014 | 9/1999 |
| DE | 20116771 U1 | 12/2001 |
| DE | 20301404 U1 | 4/2003 |
| DE | 202016006730 U1 | 2/2018 |
| EP | 0934893 A1 | 8/1999 |
| EP | 1319493 A1 | 6/2003 |
| EP | 1464458 B1 | 10/2004 |
| EP | 1208958 B1 | 1/2006 |

(56) References Cited

FOREIGN PATENT DOCUMENTS

| | | | |
|---|---|---|---|
| EP | 1837138 | B1 | 9/2007 |
| FR | 2484903 | A1 | 12/1981 |
| GB | 1496299 | A | 12/1977 |
| JP | H09171322 | A | 6/1997 |
| JP | 11040499 | A | 2/1999 |
| JP | 2002104686 | A | 4/2002 |
| JP | 2002210616 | A | 7/2002 |
| JP | 2002210818 | A | 7/2002 |
| JP | 2002241514 | A | 8/2002 |
| JP | 2002241515 | A | 8/2002 |
| JP | 2004025802 | A | 1/2004 |
| JP | 2004106519 | A | 4/2004 |
| WO | 1999017923 | A1 | 4/1999 |
| WO | 0018662 | | 4/2000 |
| WO | 0018663 | | 4/2000 |
| WO | 0185575 | | 11/2001 |
| WO | 03011716 | | 2/2003 |
| WO | 2004014776 | | 2/2004 |
| WO | 2005013247 | A1 | 2/2005 |
| WO | 2010018749 | A1 | 2/2010 |
| WO | 2011149583 | A2 | 12/2011 |

OTHER PUBLICATIONS

Entec Stress Whitening in Polypropylene (Year: 2020).*
12SL Foam Cup Straw Lid: Announced (May 24, 2019| online). Site visited (Sep. 18, 2023). Available from URL: https://www.mrplasticsinc.com/12oz-foam-cup-straw-slotted-lid-match-12j12-1000ps.*
PET Thermoform Flat Lid with FLavor Buttons: Site Visited (Sep. 14, 2023; online). Available from URL: https://www.berryglobal.com/en/product/lids/47inches-pet-thermoform-flat-lid-with-flavor-buttons-13183158.*
Fabri-Kal Greetware: Site Visited (Sep. 18, 2023). Available from URL: https://www.officedepot.com/a/products/1639774/Fabri-Kal-Greenware-Cold-Drink-Cup/.*
DART Hot/Cold Cup Lid: Site Visited (Nov. 30, 2022). Available from URL: https://www.grainger.com/product/1UCV4?gucid=N:N:PS: Paid: GGL:CSM-2295:4P7A1P:20501231&gclid=EAlalQobChMIps6Jzu7W-wIVIYXIChOnpwZYEAkYCyABEgKSkfD_BwE&gclsrc=aw.ds.*
Dixie Long-Skirt Selector Lid: Site Visited (Nov. 30, 2022). Available from URL: https://caljaninc.com/catalog/p/DXE-914LSRD/Dixie-Long-Skirt-Selector-Lid-For-12-16-21-oz/.*
Thermoform Spill Resistant Flat Lid: Site Visited [Feb. 15, 2022]. Available from Internet URL: https://catalog.berryglobal.com/products/lid/liddrink/dlt408srcp.*
Polymer Properties of Omnexus—Haze (https://web.archive.Org/web/20170519201652/https://omnexus.specialchem. com/polymer-properties/properties/haze, available in public at least on or after May 19, 2017) (Year: 2017).
Impact Plastics Blog (http://blog.impactplastics-ct.com/blog/basic-guide-to-the-three-main-grades-of-polypropylene- resin, available in public from the date May 16, 2017) (Year: 2017).
Canadian Filing of Prior Art Under Section 34.1(1) of the Canadian Patent Act by Third Party, Aug. 7, 2020, 20 pages.
Chartier Octagonal Wall Modern and Contemporary Accent Mirror: Site Visited [Sep. 14, 2020. Available from Internet URL: https://www.wayfair.com/decor-pillows/pdp/eichholtz-chartier-octagonal-wall-modern-and-contemporary-accent-mirror-eitz2666.html.
Nathan Wall Mounted Mirror: Announced Jul. 2, 2020 [online]. Site Visited [Sep. 14, 2020), Available from Internet URL: https://www.wayfair.com/decor-pillows/pdp/house-of-hampton-nathan-wall-mounted-mirror-hmpt5079. html.
Office Action dated Dec. 30, 2020 for U.S. Appl. No. 15/172,650, (pp. 1-24).
International (PCT) Search Report and Written Opinion for PCT/US20/46469 dated Nov. 30, 2020, 9 pages.
European Search Report for European App. No. 18780978.5 dated Jan. 28, 2021, 8 pages.
European Search Report for European App. No. 18844658.7 dated Apr. 4, 2021, 11 pages.
Office Action dated Jul. 1, 2021 for U.S. Appl. No. 15/172,650, BP-409 (pp. 1-6).
First Chinese Office Action for Chinese Patent App. No. 20180065303.8 dated Jun. 15, 2021, BP-516 CN ||, 12 pages.
European First Substantive Examination Report for European App. No. 18780978.5 dated Aug. 24, 2021, BP-513 EP ||, 4 pages.
Office Action dated Nov. 23, 2021 for U.S. Appl. No. 16/782,203, BP-535 US-U || (pp. 1-36).
"Polymers and Environment," by Ojeda, available at https://www.intechopen.com/chapters/42104, published on Jan. 23, 2013. (Year: 2013).
Office Action dated Jan. 14, 2022 for U.S. Appl. No. 29/761,992, BP-531 US-DES-DIV ||, (pp. 1-8).
Octagonal Wall Mirror: Announced Aug. 26, 2019 [online]. Site Visite [Jan. 10, 2022. Available from Internet URL: https://www.wayfair.com/decor-pillows/pdp/house-of-hampton-nathan-wall-mounted-mirror-hmpt5079.html, 16 pages.
European Examination Report for EP 18780978.5 dated Nov. 25, 2022, BP-513 EP ||, 5 pages.
International (PCT) Search Report and Written Opinion for PCT/US21/44766 dated Jan. 11, 2022, BP-554B PCT ||, 14 pages.
Second Chinese Office Action for Chinese Patent App. No. 20180065303.8 dated Jun. 24, 2022, BP-516 CN ||, 9 pages.
Office Action dated Feb. 22, 2022 for U.S. Appl. No. 29/765,808, (pp. 1-8).
Chinese Rejection Decision for Chinese Patent App. No. 20180065303.8 dated May 27, 2022, 12 pages.
European Search Report for European App. No. 20753137.7 dated Sep. 1, 2022, 6 pages.
Office Action dated Aug. 26, 2022 for U.S. Appl. No. 29/765,808, (pp. 1-5).
European Search Report for European App. No. 20753051.0 dated Sep. 23, 2022, 15 pages.
Solo PET Plastic Flat Cold Cup Lids: Announced (Oct. 28, 2020 (online)) Site Visited (Sep. 20, 2022). Available from Internet URL: https://www.dartcontainer.com/products/foodservice-catalog/accessories/lids/solo-pet-plastic-flat-cold-cup-lids/668ns/.
Office Action (Non-Final Rejection) dated Oct. 5, 2022 for U.S. Appl. No. 17/550,292 (pp. 1-13).
International (PCT) Search Report and Written Opinion for PCT/US2022/035911 dated Oct. 5, 2022, 8 pages.
Dart Hot/Cold Cup Lid: Site Visited (Nov. 30, 2022). Available from URL: : https://www.grainger.com/product/1UCV4?gucic :N:PS:Paid:G-GL:CSM-2295:4P7A1P:20501231&gclid=EAlalQobChMIps6Jzu7W-wIVIYXIChOnpwZYEAKYCyABEgKSkfD_BwE& gclsrc=aw.ds.
Office Action dated Dec. 8, 2022 for U.S. Appl. No. 29/843,255, (pp. 1-8).
Office Action dated Dec. 8, 2022 for U.S. Appl. No. 29/843,256, (pp. 1-8).
Supplementary European Search Report for European App. No. 20753051.0 dated Jan. 3, 2023, 13 pages.
Third Chinese Office Action for Chinese App. No. 201880065303.8 dated Jan. 5, 2023, 12 pages.
Black Plastic Straw: Announced (May 19, 2022; online). Site Vistied (Dec. 17, 2022). Available from URL: https://www.restaurantware.com/disposables/coffee-cups-accessories/coffee-cup-lids/black-plastic-2-in-1-straw-or-sip-coffee-cup-lid-fits-8- 12-16-and-20-oz-100-count-box/.
Black Flip Top Hot Cup Lid: Announced (Sep. 9, 2020 (online)). Site Visited (Dec. 17, 2022). Available from URL: https://hotcupfactory.com/collections/hot-cup-lids/products/black-flip-top-hot-cup-lids-8-10-12-16-20-22-oz.
English translation of JP-2004025802-A by EPO (OA Appendix) (Year: 2004).
English translation of JP-2002210818-A by EPO (OA Appendix) (Year: 2002).
International (PCT) Preliminary Report on Patentability dated Feb. 7, 2023, 10pages.
Office Action (Non-Final Rejection) dated Mar. 16, 2023 for U.S. Appl. No. 16/782,165, (pp. 1-14).

(56) References Cited

OTHER PUBLICATIONS

Office Action dated Apr. 13, 2023 for U.S. Appl. No. 29/798,668, (pp. 1-9).
Office Action dated Jul. 5, 2023 for U.S. Appl. No. 16/782,165, (pp. 1-7).
Office Action (Final Rejection) dated Jul. 5, 2023 for U.S. Appl. No. 16/782,165 (pp. 1-14).
Extended European Search Report for EP 20852216.9 dated Sep. 11, 2023, 7 pages.
European Extended Search Report for EP23180774.4 dated Sep. 25, 2023, 9 pages.
Office Action dated Sep. 22, 2023 for U.S. Appl. No. 29/896,014 (pp. 1-9).
Office Action dated Sep. 22, 2023 for U.S. Appl. No. 29/896,017 (pp. 1-9).
Office Action (Final Rejection) dated May 20, 2024 for U.S. Appl. No. 18/127,353, (pp. 1-19).
Office Action dated Oct. 10, 2023 for U.S. Appl. No. 29/798,668, (pp. 1-10).
Office Action (Non-Final Rejection) dated Dec. 21, 2023 for U.S. Appl. No. 17/395,182, (pp. 1-13).
Office Action (Non-Final Rejection) dated Dec. 21, 2023 for U.S. Appl. No. 18/127,353, (pp. 1-19).
Office Action (Non-Final Rejection) dated Jan. 31, 2024 for U.S. Appl. No. 18/217,763, (pp. 1-10).
Extended European Search Report for European Patent App. No. EP21853805.6 dated Jul. 23, 2024, 8 pages.
Office Action (Non-Final Rejection) dated Jun. 18, 2024 for U.S. Appl. No. 17/856,124, (pp. 1-10).
Office Action (Non-Final Rejection) dated Jun. 20, 2024 for U.S. Appl. No. 18/101,385, (pp. 1-17).
International Search Report for PCT/US06/32565, dated May 24, 2007.
Supplementary European Search Report dated Apr. 6, 2009, for European Patent Application No. 05735742.8.
International Search Report and Written Opinion dated Jul. 9, 2008, for PCT/US2008/054888.
Supplementary European Search Report dated Jul. 28, 2008, for European Patent Application No. 06813520.1.
International Search Report and Written Opinion for International Application No. PCT/US2014/006277, Jul. 15, 2014, 8 pages.
Notice of Non-Final Rejection for U.S. Appl. No. 13/448,050, filed Oct. 8, 2014, 13 pages.
Notice of Non-Final Rejection for U.S. Appl. No. 13/554,771, filed Jun. 7, 2013, 14 pages.
Notice of Non-Final Rejection for U.S. Appl. No. 14/214,236, filed Oct. 3, 2014, 10 pages.
PCT International Search Report and Written Opinion completed by the ISA/US on Jun. 19, 2014 and issued in connection with PCT/US2014/027067.
Chinse Office Action for Chinese Patent Application 201480010419.3 dated Jul. 19, 2016, 8 pages.
Extended European Search Report for European Patent Application No. 14768275.1, mailed Sep. 14, 2016, 7 pages.
Office Action dated Sep. 30, 2016 for U.S. Appl. No. 14/214,236.
Chinese Office Action for Chinese App. No. 201480010419.3 dated Dec. 22, 2016, 4 pages.
Office Action dated Apr. 3, 2017 for U.S. Appl. No. 14/921,540.
Australian Search Report for Australian App. No. 2014240016 sent Mar. 17, 2017, 3 pages.
Office Action dated May 15, 2017 for U.S. Appl. No. 14/214,236.
Singapore Written Opinion for Singapore Patent App. No. 11201507343Y dated Sep. 6, 2017, 6 pages.
Office action dated Jun. 14, 2017 for U.S. Appl. No. 14/921,540; (pp. 1-8).
Australian Search Report for Australian App. No. 2014240016 sent Aug. 25, 2017, 3 pages.
Office Action mailed Oct. 6, 2017 for U.S. Appl. No. 15/485,299; (pp. 1-5).
Japanese Office Action for Japanese App. No. 2016-502328 sent Oct. 3, 2017, 11 pages.
Office Action dated Jan. 16, 2018 for U.S. Appl. No. 14/214,236; (pp. 1-13).
Russian Office Action and Search Report for Russian App. No. 2015134775 sent on Mar. 13, 2018, 10 pages.
Japanese Office Action for Japanese App. No. 2016-502328 sent Mar. 6, 2018, 4 pages.
Envato Tuts+. Create a Set of Flat Precious Gems Icons in Adobe Illustrator by Yulia Sokolova. Apr. 9, 2014 [earliest online date], [ site visited Feb. 22, 2018]. Available from Internet, <URL:https://design.tutsplus.com/tutorials/ create-a-set-of-flat-precious-gems-icons-in-adobe-illustrator--vector-26188>. (Year: 2014), 77 pages.
Office Action dated Apr. 4, 2018 for U.S. Appl. No. 29/599,942 (pp. 1-5).
Infinity Blade Wiki. Hexagon gem. Nov. 17, 2013 [earliest online date], [site visited Feb. 22, 2018]. Available from Internet, <URL:http://infinityblade.wikia.conn/wiki/Hexagon gem>. (Year: 2013), 1 page.
Office Action dated Apr. 4, 2018 for U.S. Appl. No. 29/599,948 (pp. 1-5).
Office Action dated Apr. 16, 2018 for U.S. Appl. No. 15/485,299, (pp. 1-4).
Office Action dated Jul. 10, 2018 for U.S. Appl. No. 15/172,650, (pp. 1-9).
Office Action dated Jul. 5, 2018 for U.S. Appl. No. 29/599,942, (pp. 1-4).
Blogspot. The Herman Letters. Jul. 12, 2011 [earliest online date], [site visited Jul. 23, 2018]. Available from Internet, <URL: http://theherrnanletters.blogspot.corn/2011/07/ipost-190-is-rncdonalds-selling-p.htrnl>. (Year: 2011).
Office Action dated Jul. 27, 2018 for U.S. Appl. No. 29/599,948, (pp. 1-5).
Office Action dated Nov. 30, 2018 for U.S. Appl. No. 29/599,948, (pp. 1-5).
Office Action dated Jan. 7, 2019 for U.S. Appl. No. 15/172,650, (pp. 1-9).
International (PCT) Search Report and Written Opinion for PCT App. No. PCT/US18/264467 mailed Jul. 3, 2018, 11 pages.
International (PCT) Search Report and Written Opinion for PCT/US18/45575 established Oct. 19, 2018, 13 pages.
Office Action dated Sep. 12, 2019 for U.S. Appl. No. 15/946,023, (pp. 1-15).
First Examination Report for Indian App. No. 8804/DELNP/2015 sent Oct. 30, 2019, 6 pages.
Office Action mailed Mar. 19, 2020, for U.S. Appl. No. 15/172,650, (pp. 1-11).
Office Action dated Mar. 19, 2020, for U.S. Appl. No. 15/172,650 (pp. 1-11).
Third Party Submission Under 37 CFR 1.290 in U.S. Appl. No. 16/057,122, dated Apr. 16, 2020, 49 pages.
Solo 668NS: Site Visited [Apr. 30, 2020]. Available from Internet URL: https://www.dartcontainer.com/products/foodservice-catalog/accessories/lids/solo-pet-plastic-flat-cold-cup-lids/668ns/ 1/2.
Single Use Spill REsistant Flat Lid_Berry Global: Site Visited [Apr. 30, 2020]. Available from Internet URL: https://catalog.berryglobal.com/products/lid/liddrink/dlt308srcp.
Thermoform Strawless Lid with Straw Slot_Berry Global: Site Visited [Apr. 30, 2020]. Available from Internet URL: https://catalog. berryglobal .com/products/lid/liddrink/dlt402ssl p.
International Search Report and Writen Opinion dated Apr. 29, 2020, 11 pages.
International (PCT) Search Report and Written Opinion for PCT/2020/016769 dated May 27, 2020, 12 pages.
Office Action dated Aug. 6, 2020 for U.S. Appl. No. 16/736,849, (pp. 1-18).
Office Action dated Aug. 20, 2020 for U.S. Appl. No. 16/057,122, (pp. 1-20).
Polymer Properties of Omnexus—Transparency (https://web.archive.Org/web/20170406012756/https://omnexus.specialchem.com/ polymer-properties/properties/transparency, available in public at least on or after Apr. 6, 2017) (Year: 2017).
Extended European Search Report for European Patent App. No. EP24204859.3 dated Nov. 12, 2024, 8 pages.

(56) References Cited

OTHER PUBLICATIONS

Canadian Office Action for Canadian App. No. 3072302 sent Sep. 23, 2024, 3 pages.
Office Action (Non-Final Rejection) dated Dec. 12, 2024 for U.S. Appl. No. 18/125,308 (pp. 1-26).

* cited by examiner

POLYPROPYLENE SHEETS AND ARTICLES

PRIORITY CLAIM

This application is a Continuation of U.S. application Ser. No. 16/782,165, filed Feb. 5, 2020, which claims priority under 35 U.S.C. § 119(e) to U.S. Provisional Application No. 62/802,012, filed Feb. 6, 2019, each of which is expressly incorporated by reference herein.

BACKGROUND

The present disclosure relates to polymeric materials, and particularly to polymeric sheets and articles. More particularly, the present disclosure relates to polymeric sheets and polymeric articles that comprise polypropylene.

SUMMARY

According to the present disclosure, a sheet of polymeric material is made using an extruding process and articles are formed from the sheet. The articles may be, for example, bowls, plates, trays, lids, pill containers, food containers, storage containers, tamper evident containers, films, film covers, indicator selectors, damage indicators for containers, or any other suitable articles.

In illustrative embodiments, the sheet of polymeric material and the articles are transparent. In illustrative embodiments, the sheet of polymeric material and articles comprise polypropylene.

In illustrative embodiments, the sheet of material comprises at least about 55% by weight polypropylene base resin and at least about 25% by weight polypropylene secondary resin. In illustrative embodiments, the sheet of material comprises about 65% by weight polypropylene base resin and about 35% by weight polypropylene secondary resin. In illustrative embodiments, the sheet of material comprises about 75% by weight polypropylene base resin and about 25% by weight polypropylene secondary resin. In illustrative embodiments, the base resin is a polypropylene impact copolymer and the secondary resin is a polypropylene homopolymer.

In some embodiments, the sheet of material comprises about 20% of a tertiary resin. In illustrative embodiments, the tertiary resin is a random copolymer.

In illustrative embodiments, a lid for a container is made from a sheet of polymeric material in accordance with the present disclosure and is adapted to mate with a brim included in the container to close an aperture opening into an interior region formed in the container. In illustrative embodiments, the lid is transparent to allow a consumer to view the contents of the container through the lid. In illustrative embodiments, the lid includes at least one deformable product-identification feature. The deformable product-identification feature is configured to selectively deform to indicate visually information about the container such as, for example, a content of the container, a date associated with the container, evidence of tampering of the container, damage or impacts to the container, etc.

In illustrative embodiments, the product-identification feature is configured to move from an un-deformed arrangement to a deformed arrangement to indicate the information visually in response to a deformation force. In the un-deformed arrangement, the product-identification feature is transparent. In the deformed arrangement, the product-identification feature is at least partially opaque to indicate information visually to a person.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which.

DETAILED DESCRIPTION

Figure 1:
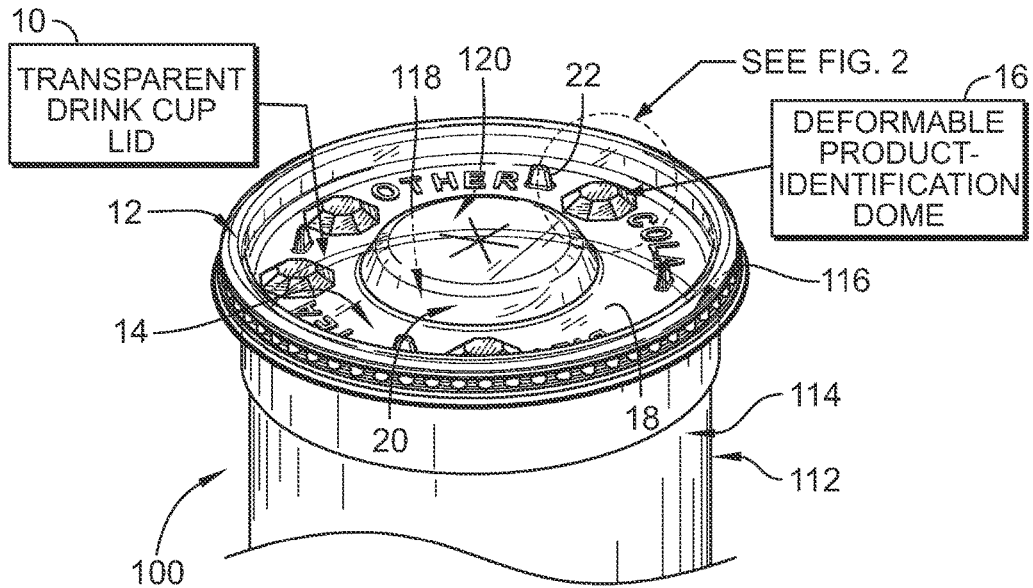
FIG. 1 is a perspective and diagrammatic view of a first embodiment of a polypropylene article in accordance with the present disclosure showing that the article is a polypropylene drink cup lid that includes a brim mount mated with a brim of a cup, a central closure coupled to the brim mount to close a top aperture opening into an interior region formed in the cup, and a plurality of deformable product-identification domes, the central closure is transparent to allow a consumer to view the contents of the interior region of the cup through the drink cup lid, and each product-identification dome is configured to move from an un-deformed arrangement in which the product-identification dome is transparent, as suggested in FIG. 2, to a deformed arrangement in which the product-identification dome is at least partially opaque to indicate visually a selected content of the cup, such as a selected beverage flavor, in response to a deformation force as suggested in FIG. 3.

An article 10 shown as a drink cup lid 10 in accordance with the present disclosure is shown in FIG. 1. Article 10 is made in a thermoforming process from a sheet 50 made of polymeric material as suggested in FIG. 19. Illustratively, sheet 50 and article 10 are formed from non-aromatic material comprising polypropylene and are transparent with relatively high clarity and relatively low haze. The transparent polypropylene sheet 50 and article 10 craze or whiten and become more opaque in response to being deformed. The crazing effect may be used to indicate visually information to a user such as, for example, contents of a container, a date, damage to sheet 50 or article 10, and/or evidence of tampering. In illustrative embodiments, sheet 50 and article 10 may craze in response to deformation in cold environments without sheet 50 or article 10 fracturing.

In contrast, some transparent sheets of polymeric material and articles are made from non-recyclable materials or materials that are more difficult to recycle when compared to polypropylene such as, for example, polystyrene. Some transparent sheets of polymeric material and articles do not craze or do not provide sufficient crazing for indicating visually information to a user when deformed. For example, sheets and articles made of polyethylene terephthalate (PET) may not craze or whiten when deformed or stressed and may fracture or crack if deformed in cold environments.

In illustrative embodiments, sheet 50 comprises at least about 55% by weight polypropylene base resin and at least about 25% by weight polypropylene secondary resin. In illustrative embodiments, sheet 50 comprises about 65% by weight polypropylene base resin and about 35% by weight polypropylene secondary resin. In other illustrative embodiments, sheet 50 comprises about 75% by weight polypropylene base resin and about 25% by weight polypropylene secondary resin. In illustrative embodiments, the base resin is a polypropylene impact copolymer and the secondary resin is a polypropylene homopolymer. In some embodiments, sheet 50 comprises about 20% of a tertiary resin. In illustrative embodiments, the tertiary resin is a random copolymer.

Article 10 may include one or more deformable information features 16 that craze (whiten) in response to deformation of the deformable information features. Information feature 16 may be a dome, a living hinge, pyramid, invertible geometry, flap, hinge, an edge, or any other suitable stress concentrator. Information features 16 are referred to as domes with reference to drink cup lids 10, 210, 310, 410, 510, 610, 710, 810, 910, 1010. Even still, the term dome is not limited to a rounded or circular vault and, as shown, can include edges and panels and encompasses any other deformable shapes that have invertible or deformable geometry. Moreover, deformable information feature 16 may be any region of sheet 50 and article 10 that is deformed beyond a neutral plane of the region.

Article 10 is embodied in the disclosure as drink cup lids 10, 210, 310, 410, 510, 610, 710, 810, 910, 1010 as shown in FIGS. 1-18. In other embodiments, article 10 is a bowl, plate, tray, lid, pill container, food container, storage container, tamper evident container, film, film cover, indicator selector, damage indicator for containers, or any other suitable article.

Drink cup lid 10 made from sheet 50 is formed to include deformable information feature 16 illustrated as a first embodiment of a deformable product-identification dome 16 as shown in FIGS. 1-8. Other embodiments of drink cup lid 210, 310, 410, 510, 610, 710, 810, 910, 1010 in accordance with the present disclosure having other embodiments of a deformable product-identification dome 216, 316, 416, 516, 616, 716, 816, 916, 1016 are shown in FIGS. 9-18. Other product-identification domes or information features 16 may include one or more rings, one or more stair steps, and/or radius joints in other embodiments. Other drink cup lids and articles 10 may include other shaped information features 16 such as, for example, pyramids, invertible geometry, flaps, hinges, edges, and features that are deformable beyond their neutral plane.

Drink cup lids 10, 210, 310, 410, 510, 610, 710, 810, 910, 1010 are comprised from a polypropylene material and are substantially transparent until one of the product-identification domes is moved to a deformed arrangement which, in some examples, causes the product-identification dome to be at least partially opaque and communicate visually that a beverage has been selected. Information features 16 such as product-identification domes may change opacity in their entire surface area or some portion of the surface area of the features change opacity to communicate visually information to a user.

In some embodiments, drink cup lids 10, 210, 310, 410, 510, 610, 710, 810, 910, 1010 are made from non-aromatic polymeric materials made from a formulation. In illustrative embodiments, drink cup lids 10, 210, 310, 410, 510, 610, 710, 810, 910, 1010 are made from sheet 50.

Drink cup lid 10 is configured to mount onto a cup 112 to provide a container 100 as shown in FIG. 1. Container 100 is configured to store food products such as, for example, a liquid beverage. Cup 112 includes a floor (not shown) and a sidewall 114 that cooperate to define an interior liquid-storage region 118 and a brim 116 that defines a top aperture 120 that opens into interior liquid-storage region 118. Drink cup lid 10 mounts with brim 116 to block contents of interior liquid-storage region 118 from escaping cup 112 through top aperture 120. In illustrative embodiments, drink cup lid 10 is transparent to allow a consumer to view contents of interior liquid-storage region 118 of cup 112 through drink cup lid 10.

Drink cup lid 10 includes a brim mount 12, a central closure 14, and a plurality of deformable product-identification domes 16 as shown in FIG. 1. Brim mount 12 is configured to mount with brim 116 included in cup 112 and is ring shaped in illustrative embodiments. Central closure 14 is appended to brim mount 12 and closes top aperture 120 and block access into interior liquid-storage region 118 of cup 112. Product-identification domes 16 append from central closure 14 and are configured to move from an un-deformed arrangement, shown in FIG. 2, to a deformed arrangement, shown in FIG. 3, to indicate visually a selected flavor of a liquid beverage stored in interior liquid-storage region 118 of cup 112.

Product-identification domes 16 indicate to a consumer that a liquid beverage contained in cup 112 should have a flavor corresponding to indicia 30 adjacent a deformed product-identification dome 16. Product-identification domes 16 are configured to change in transparency in response to being deformed into the deformed arrangement to contrast with the transparent central closure 14 and other un-deformed product-identification domes 16 and indicate the selected beverage flavor as suggested in FIGS. 2 and 3. In the un-deformed arrangement, product-identification domes 16 are transparent as suggested in FIG. 2. Portions of product-identification domes 16 have a low transparency and/or are partially opaque when product-identification domes 16 are in the deformed arrangement as suggested in FIG. 3. In other embodiments, product-identification domes 16 have about the same transparency in the deformed arrangement and the un-deformed arrangement.

Figures 2, 3:
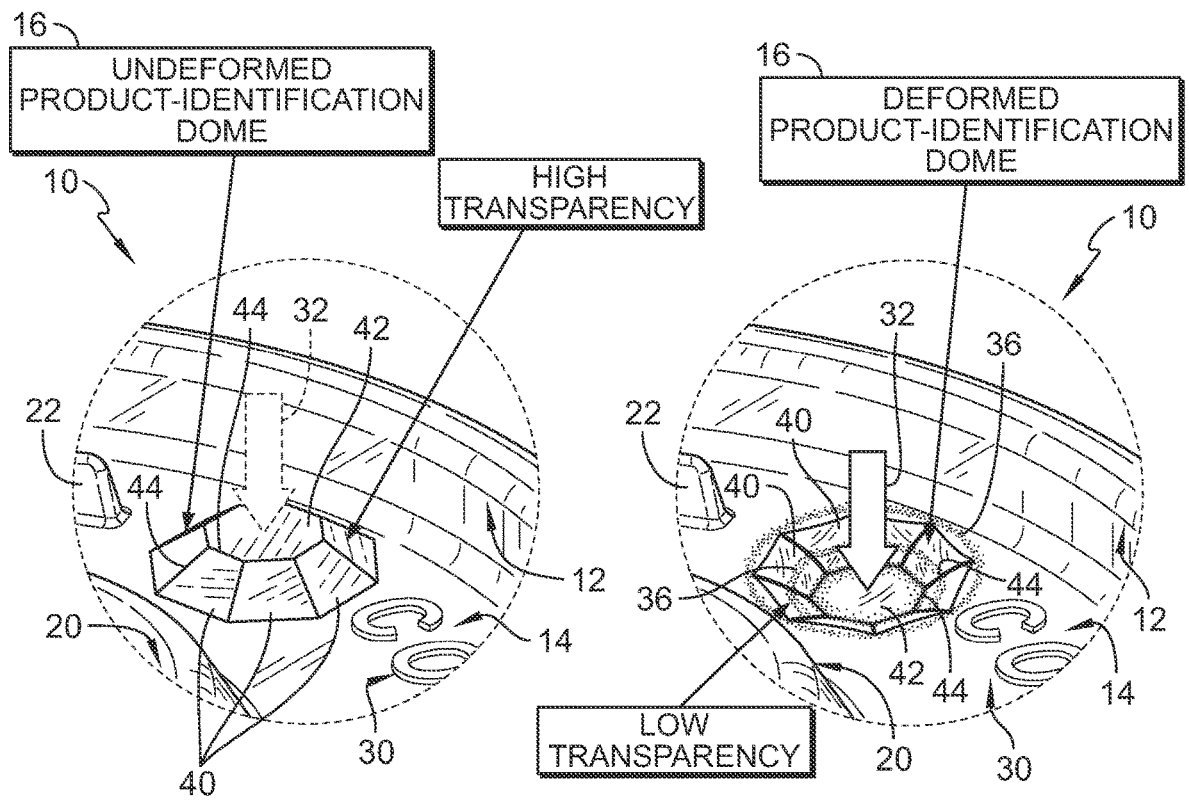
FIG. 2 is an enlarged view of FIG. 1 showing one of the deformable product-identification domes in an initial un-deformed arrangement in which the product-identification dome extends upwardly away from the cup and has high transparency to indicate visually that the product-identification dome is not selected, the product-identification dome having a plurality of panels that form stress concentrators configured to increase the opacity of the product-identification dome in response to the product-identification dome being deformed, and suggesting that the downward deformation force may be applied to the product-identification dome to move the product-identification dome to the deformed arrangement shown in FIG. 3.
FIG. 3 is a view similar to FIG. 2 after the downward deformation force has been applied to the deformable product-identification dome to cause the product-identification dome to assume the deformed arrangement having high opacity due, in part, to the stress concentrators formed in the product-identification dome, and suggesting that the high opacity of the deformed product-identification dome contrasts with the remaining transparent portions of the drink cup lid to indicate visually the selected contents of the cup.

In illustrative embodiments, each product-identification dome 16 includes a plurality of panels 40 and a dome cap 42 as shown in FIG. 2. Panels 40 are appended to central closure 14 and arranged to extend upwardly away from central closure 14 in a circular pattern. Dome cap 42 is located in spaced apart relation to central closure 14 and extends between and interconnects panels 40. Illustratively, dome cap 42 is octagon shaped.

Adjacent panels 40 are coupled to one another and coupled to dome cap 42 at stress concentrator joints 44 as shown in FIGS. 2 and 3. Stress concentrator joints 44 focus stresses in product-identification domes 16 in response to deformation of domes 16 to cause the transparency of product-identification domes 16 to change when moving from the un-deformed arrangement to the deformed arrangement. In some embodiments, product-identification domes 16 without stress concentrator joints 44 do not change in transparency in the deformed arrangement as suggested in FIG. 14. In other embodiments, other stress concentrator features are used to cause a transparency of product-identification domes 16 to change in the deformed arrangement.

Drink cup lid 10 includes brim mount 12, central closure 14, and deformable product-identification domes 16 as shown in FIG. 1. Brim mount 12 is configured to mount lid 10 with brim 116 included in cup 112. Central closure 14 is appended to brim mount 12 and closes top aperture 120 and block access into interior liquid-storage region 118 of cup 112. Product-identification domes 16 append from central closure 14 and are configured to move from the un-deformed arrangement, shown in FIG. 2, to the deformed arrangement, shown in FIG. 3, in response to the downward deformation force 32 to indicate visually a selected flavor of a liquid beverage stored in interior liquid-storage region 118 of cup 112.

Brim mount 12 has a round shape with a center point located on a central axis of drink cup lid 10 as suggested in FIGS. 1 and 4-6. In illustrative embodiments, brim mount 12 is transparent. In other embodiments, brim mount 12 is a non-round shape such as square for example. In some embodiments, brim mount 12 is omitted and lid 10 is plug fit, ID fit, heat sealed, or threaded to a container.

Figure 4:
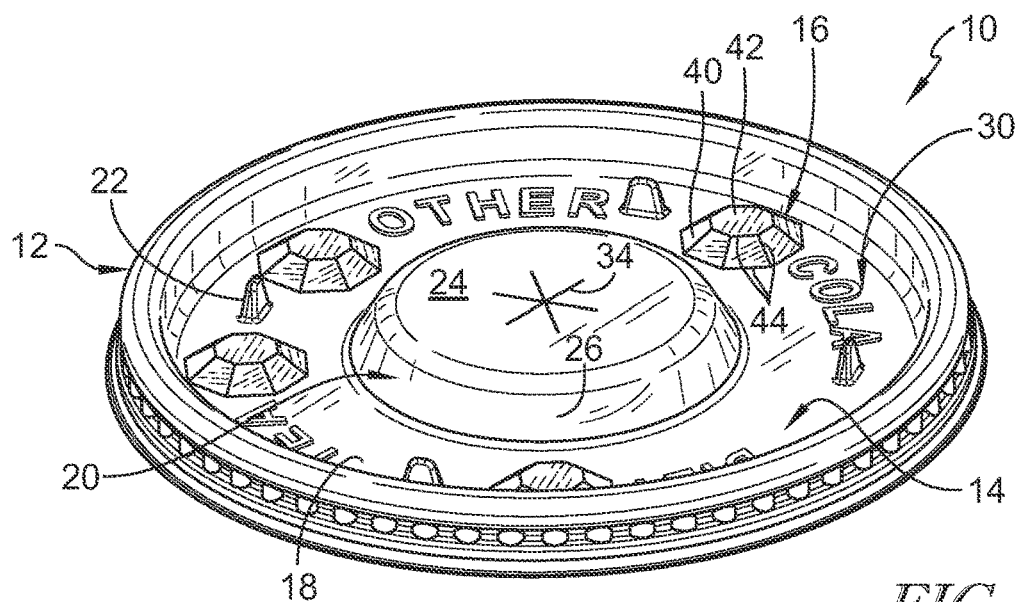
FIG. 4 is a perspective view of the drink cup lid of FIG. 1 showing that the lid includes the central closure, the brim mount arranged around the central closure, and the plurality of deformable product-identification domes and further showing that the central closure is transparent and includes a liquid-retainer floor and an elevated basin arranged to extend upwardly away from the floor.
Figure 5:
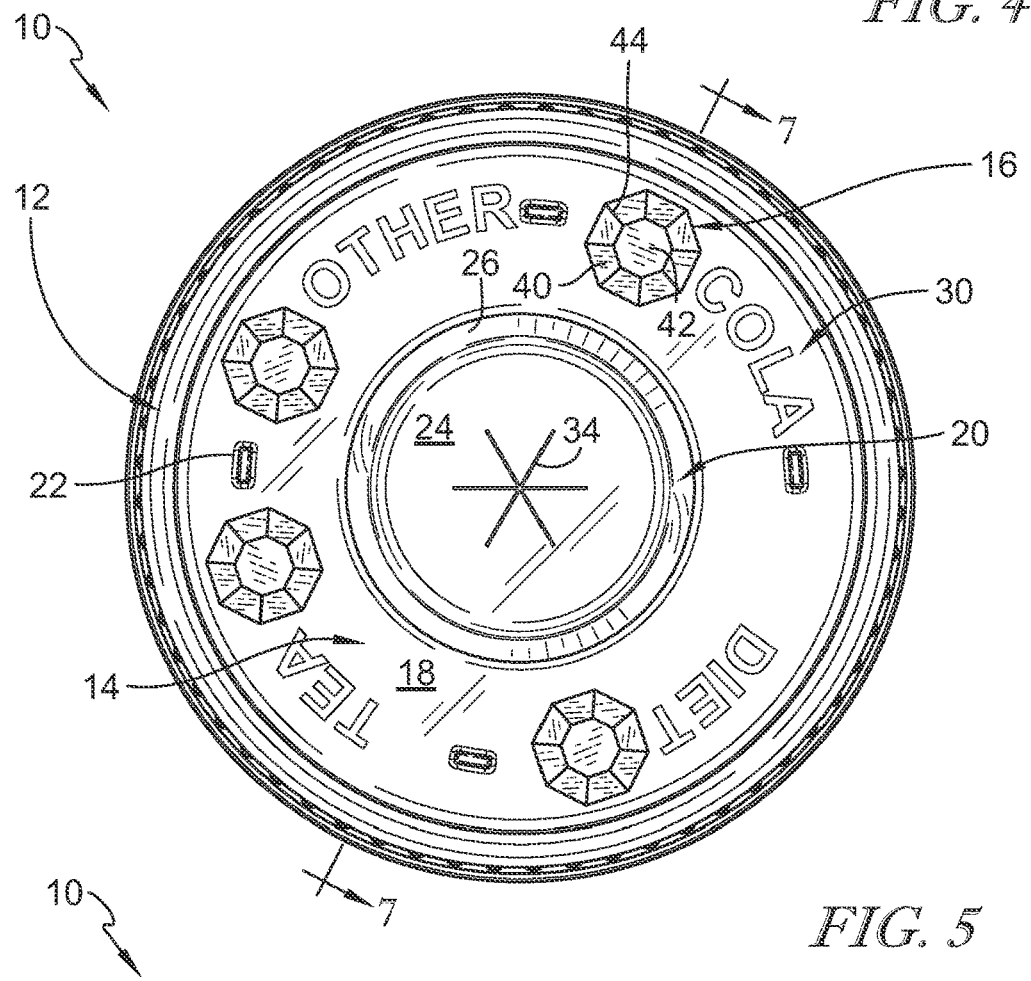
FIG. 5 is a top plan view of the drink cup lid of FIG. 4 showing that the liquid-retainer floor illustratively includes indicia such as text associated with selectable contents of the cup and the product-identification domes and the indicia cooperate to indicate visually the selected contents of the cup.
Figure 6:
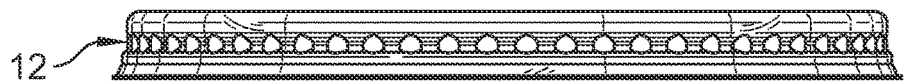
FIG. 6 is a front elevation view of the drink cup lid of FIG. 4 showing the brim mount of the drink cup lid and suggesting that the product-identification domes do not extend upwardly away from the cup beyond a top surface of the brim mount.

Central closure 14 illustratively includes a liquid-retainer floor 18, an elevated basin 20, and stack-assist nubs 22 as shown in FIGS. 4 and 5. Liquid-retainer floor 18 extends radially inward from brim mount 12 toward elevated basin 20. Elevated basin 20 extends upwardly away from liquid-retainer floor 18 and includes a straw cut 34. Stack-assist nubs 22 are located radially between brim mount 12 and elevated basin 20 and extend upwardly away from liquid-retainer floor 18 to assist in nesting multiple drink cup lids 10 to form a stack of drink cup lids 10 and in un-stacking multiple nested drink cup lids 10. In some embodiments, central closure 14 includes an opening that extends through central closure. The opening may be sized to allow a hand or spoon to pass through the opening.

Liquid-retainer floor 18 is arranged to collect spilled liquid between brim mount 12 and elevated basin 20 as suggested in FIG. 4. In the illustrative embodiment, liquid-retainer floor 18 is formed to include indicia 30 that correspond to potential flavors of liquid beverages commonly stored in cup 112. In the illustrative embodiment, indicia 30 comprise raised text corresponding to cola, diet, tea, and other flavors of liquid beverages. Indicia 30 cooperate with product-identification domes 16 to communicate visually to a consumer that the liquid beverage contained in cup 112 should have a flavor corresponding to indicia 30 adjacent a deformed product-identification dome 16.

Elevated basin 20 includes a raised floor 24 and a curved liquid-retaining wall 26 as shown in FIGS. 4-5. Raised floor 24 is coupled to curved liquid-retaining wall 26 and includes straw cut 34. Curved liquid-retaining wall 26 extends between and interconnects liquid-retainer floor 18 and raised floor 24. Illustratively, curved liquid-retaining wall 26 has an angle of less than 90 degrees relative to liquid-retainer floor 18 to direct liquid spilled onto raised floor 24 downward onto liquid-retainer floor 18.

As shown in FIGS. 4 and 5, each deformable product-identification dome 16 is spaced apart circumferentially from neighboring deformable product-identification domes 16. Each deformable product-identification dome 16 is configured to move from the un-deformed arrangement, shown in FIGS. 2 and 7, to the deformed arrangement, shown in FIGS. 3 and 8, in response to downward deformation force 32.

Figure 7:
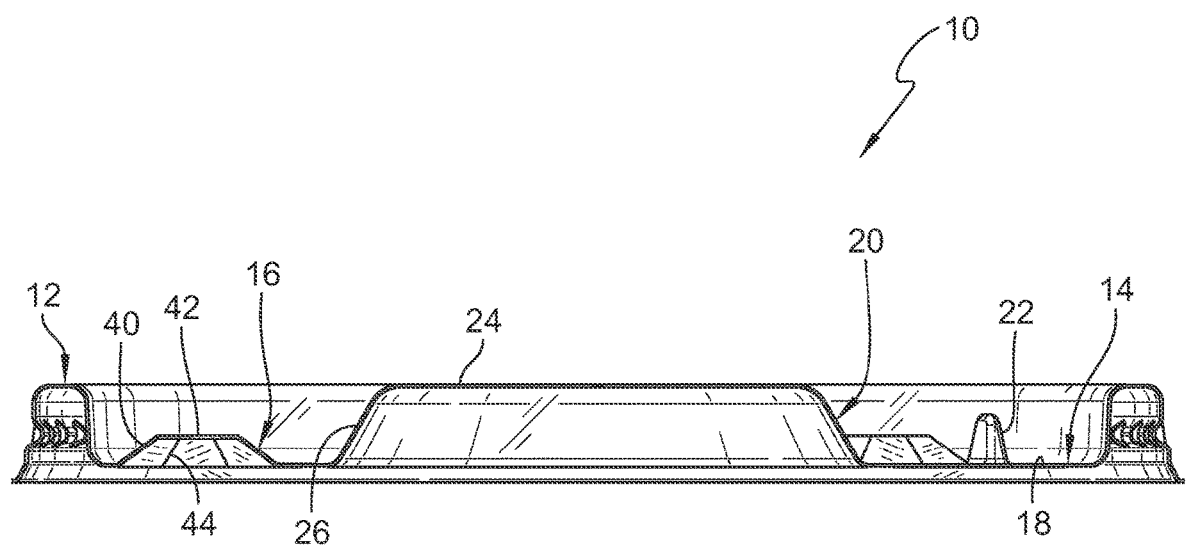
FIG. 7 is a sectional view taken along line 7-7 of FIG. 5 showing one of the product-identification domes included in the drink cup lid in the un-deformed arrangement in which the product-identification dome extends upwardly away from the cup and suggesting that the product-identification dome is transparent in the un-deformed arrangement.
Figure 8:
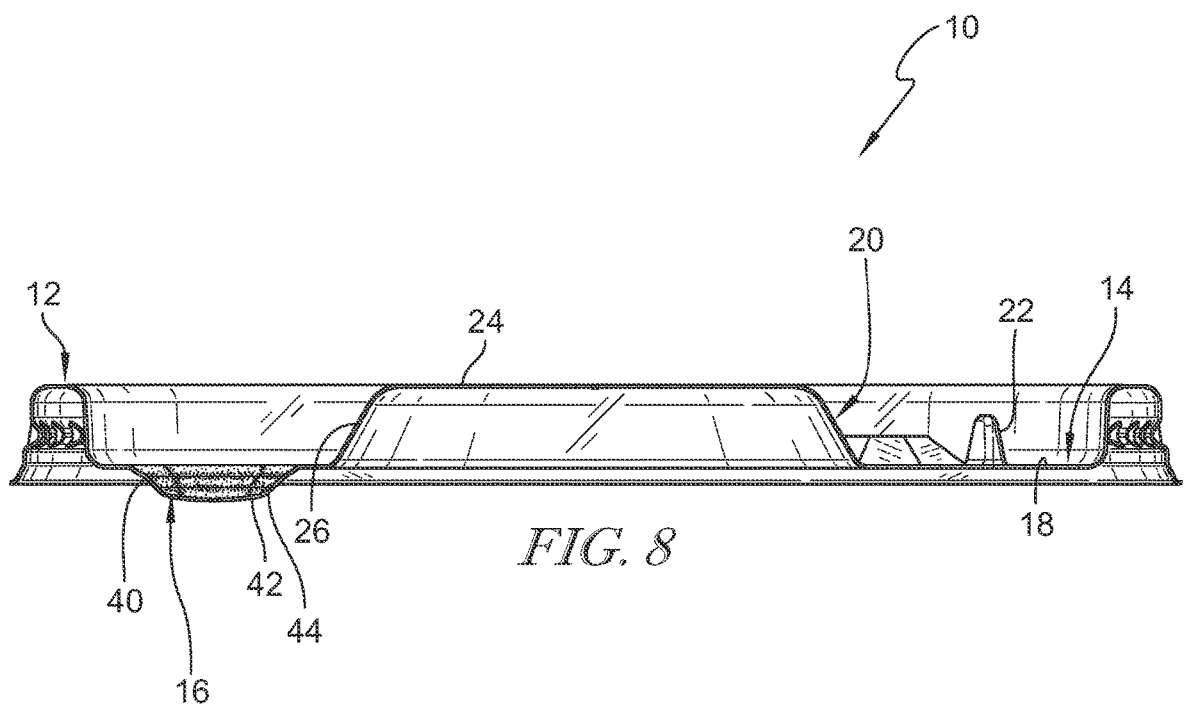
FIG. 8 is a view similar to FIG. 7 after the product-identification dome has been deformed to assume the deformed arrangement in which the product-identification dome extends downwardly toward the cup and suggesting that at least portions of the product-identification dome is relatively opaque in the deformed arrangement.

As shown in FIG. 7, in the un-deformed arrangement, product-identification dome 16 is transparent and extends upwardly away from liquid-retainer floor 18. In use, a user may apply downward deformation force 32 to deformable product-identification dome 16 causing deformable product-identification dome 16 to deform to assume the deformed arrangement as suggested in FIGS. 3 and 8. In the deformed arrangement, deformable product-identification dome 16 extends downwardly away from liquid-retainer floor 18 toward the floor of cup 112. In the deformed arrangement, product-identification dome 16 is less transparent than in the un-deformed arrangement and/or at least partially opaque to indicate visually a selected content of cup 112.

Product-identification dome 16 is configured to move to an un-deformed returned arrangement from the deformed arrangement in response to an upward return force. Surprisingly, it was found that in some example, some areas of the product-identification dome 16 that were at least partially opaque in the deformed arrangement become less opaque or become transparent in the un-deformed returned arrangement. In some embodiments, the product-identification dome 16 is transparent in the un-deformed return arrangement. In some embodiments, the product-identification dome 16 is partially transparent in the un-deformed return arrangement.

The illustrative product-identification dome 16 includes the plurality of panels 40 and dome cap 42 as shown in FIG. 2. Panels 40 are appended to liquid-retainer floor 18 and extend upwardly away from liquid-retainer floor 18 in a circular pattern. Dome cap 42 is located in spaced apart relation to liquid-retainer floor 18 and extends between and interconnects panels 40.

Each panel 40 is illustratively trapezoidal. In the illustrative embodiment, deformable product-identification dome 16 includes eight panels 40 as shown in FIGS. 4 and 5. In other embodiments, deformable product-identification dome 16 includes any number of panels 40. Dome cap 42 is octagon shaped and coupled to each of the eight panels 40.

Adjacent panels 40 are coupled to one another at stress concentrator joints 44 as shown in FIGS. 2 and 5. Panels 40 are further coupled to dome cap 42 at stress concentrator joints 44. Stress concentrator joints 44 focus stresses in the material of product-identification dome 16 in response to deformation of product-identification dome 16 to cause the transparency of product-identification dome 16 to change in response to moving from the un-deformed arrangement to the deformed arrangement. Stress concentrator joints 44 may be formed by a plurality of geometry arrangements that focus stress when product-identification dome 16 is deformed. In the illustrative embodiment, adjacent panels 40 are coupled to one another along linear geometries to form stress concentrator joints 44. In contrast, hemispherical product-identification domes may lack stress concentrator joints 44.

As suggested in FIG. 3, stress concentrator joints 44 of one of the product-identification domes 16 are transparent when the product-identification dome 16 is in the un-deformed arrangement and are opaque when the product-identification dome is in the deformed arrangement. Illustratively, stress concentrator joints 44 cause opaque rings 36 to form in product-identification dome 16 when product-identification dome 16 is in the deformed arrangement. The opaque rings may become transparent and/or become undetectable visually when product-identification dome 16 is in the un-deformed returned arrangement.

In other embodiments, product-identification domes 16 include other stress concentrator features in addition to or instead of stress concentrator joints 44 as suggested in FIGS. 9-16. Stress concentrator features focus stresses in the material of product-identification dome 16 in response to deformation of product-identification dome 16 to cause the transparency of product-identification dome 16 to change in response to moving from the un-deformed arrangement to the deformed arrangement. Stress concentrator features may include depressions, deformations, or geometric formations in product-identification domes 16.

Figure 14:
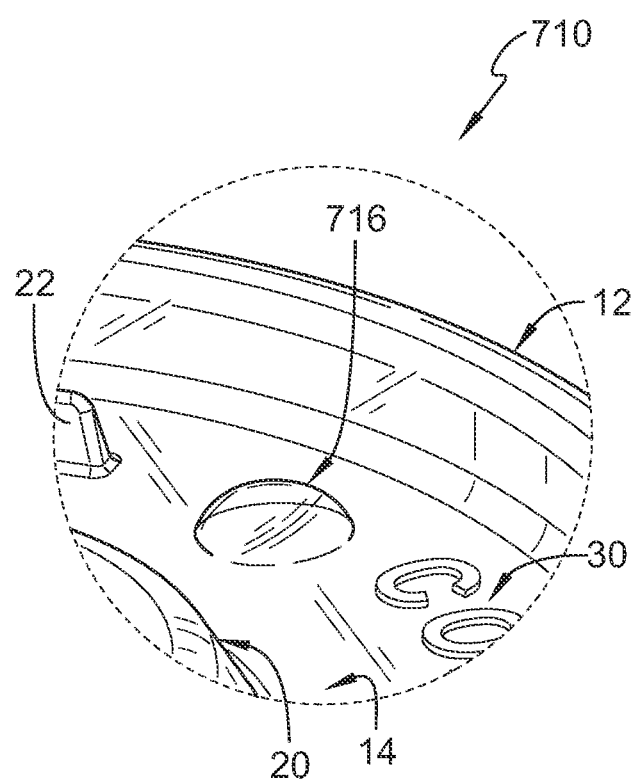
FIG. 14 is an enlarged partial perspective view of a seventh embodiment of a drink cup lid in accordance with the present disclosure showing that the drink cup lid includes a seventh embodiment of a product-identification dome.

In some embodiments, product-identification domes 16 are hemispherical and do not include stress concentrator joints 44 or stress concentrator features as shown in FIG. 14. In such embodiments, product-identification domes 16 may not change transparency in response to deformation of product-identification dome 16 moving from the un-deformed arrangement to the deformed arrangement.

Drink cup lid 10 is transparent to allow a consumer to view contents of interior liquid-storage region 118 of cup 112 through drink cup lid 10. In some embodiments, drink cup lid 10 is not transparent. In some embodiments, each product-identification dome 16 is less transparent in the deformed arrangement than the un-deformed arrangement to indicate visually a selected flavor of a liquid beverage stored in interior liquid-storage region 118 of cup 112. In some embodiments, each product-identification dome 16 is relatively opaque in the deformed arrangement as compared to the un-deformed arrangement to indicate visually a selected flavor of a liquid beverage stored in interior liquid-storage region 118 of cup 112. In some embodiments, each product-identification dome 16 has portions that are transparent and portions that are relatively opaque in the deformed arrangement as compared to having all portions being relatively transparent in the un-deformed arrangement to indicate visually a selected flavor of a liquid beverage stored in interior liquid-storage region 118 of cup 112. A consumer may be able to see through product-identification domes 16 when product-identification domes 16 are in the un-deformed arrangement and the deformed arrangement.

Product-identification domes 16 share the clarity and haze values of drink cup lid 10 when product-identification domes 16 are in the first arrangement. In other words, product-identification domes 16 share the clarity and haze values of drink cup lid 10 before product-identification domes 16 are depressed downward. As such, deformable information features 16 share the clarity and haze values of article 10 before deformable information features 16 are depressed downward.

Figure 9:
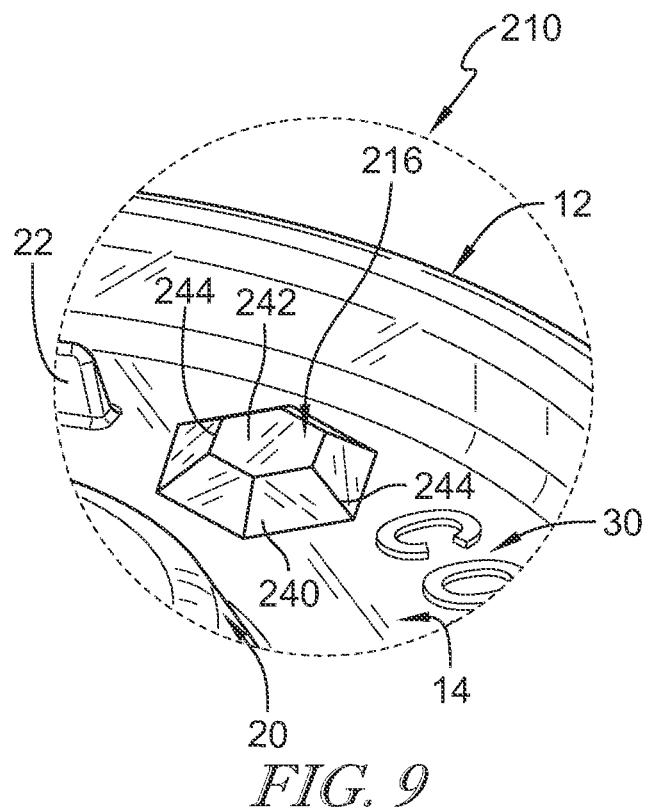
FIG. 9 is an enlarged partial perspective view of a second embodiment of a drink cup lid in accordance with the present disclosure showing that the drink cup lid includes a second embodiment of a product-identification dome.

Another embodiment of a drink cup lid 210 in accordance with the present disclosure is shown in FIG. 9. Drink cup lid 210 includes brim mount 12, central closure 14, and at least one deformable product-identification dome 216.

Product-identification dome 216 includes a plurality of panels 240 and a dome cap 242 as shown in FIG. 9. Panels 240 are appended to liquid-retainer floor 18 of central closure 14 and extend upwardly away from liquid-retainer floor 18 in a circular pattern. Dome cap 242 is located in spaced apart relation to liquid-retainer floor 18 and extends between and interconnect panels 240.

Deformable product-identification dome 216 includes six panels 240 as shown in FIG. 9. Each panel 240 is trapezoidal. Dome cap 242 is hexagon shaped and is coupled to each of the six panels 240. Adjacent panels 240 are coupled to one another at stress concentrator joints 244. Panels 240 are further coupled to dome cap 242 at stress concentrator joints 244. Stress concentrator joints 244 focus stresses in the material of product-identification dome 216 in response to deformation of product-identification dome 216 to cause the transparency of product-identification dome 216 to change in response to moving from the un-deformed arrangement to the deformed arrangement.

Figure 10:
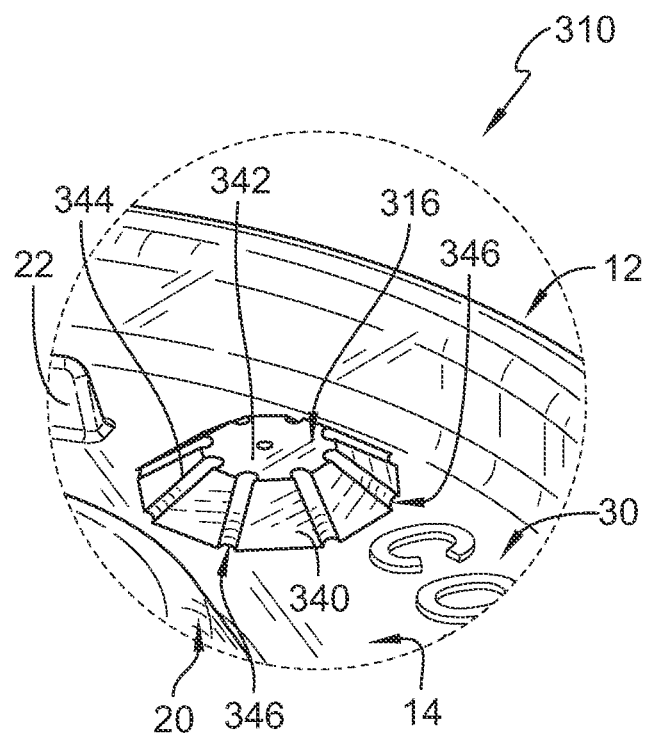
FIG. 10 is an enlarged partial perspective view of a third embodiment of a drink cup lid in accordance with the present disclosure showing that the drink cup lid includes a third embodiment of a product-identification dome.

Another embodiment of a drink cup lid 310 in accordance with the present disclosure is shown in FIG. 10. Drink cup lid 310 includes brim mount 12, central closure 14, and at least one deformable product-identification dome 316.

Product-identification dome 316 includes a plurality of panels 340 and a dome cap 342 as shown in FIG. 10. Panels 340 are appended to liquid-retainer floor 18 of central closure 14 and extend upwardly away from liquid-retainer floor 18 in a circular pattern. Dome cap 342 is located in spaced apart relation to liquid-retainer floor 18 and extends between and interconnect panels 340.

Deformable product-identification dome 316 includes eight panels 340 as shown in FIG. 10. Each panel 340 is trapezoidal. Dome cap 342 is octagon shaped and is coupled to each of the eight panels 340. Adjacent panels 340 are coupled to one another at stress concentrator joints 344. Panels 340 are further coupled to dome cap 342 at stress concentrator joints 344.

As shown in FIG. 10, deformable product-identification dome 316 includes a plurality of stress concentrator features 346 aligned with stress concentrator joints 344 formed between adjacent panels 340. Stress concentrator features 346 define channels 346 arranged to extend into deformable product-identification dome 316 toward central closure 14. Illustratively, channels 346 extend partway into dome cap 342.

Figure 11:
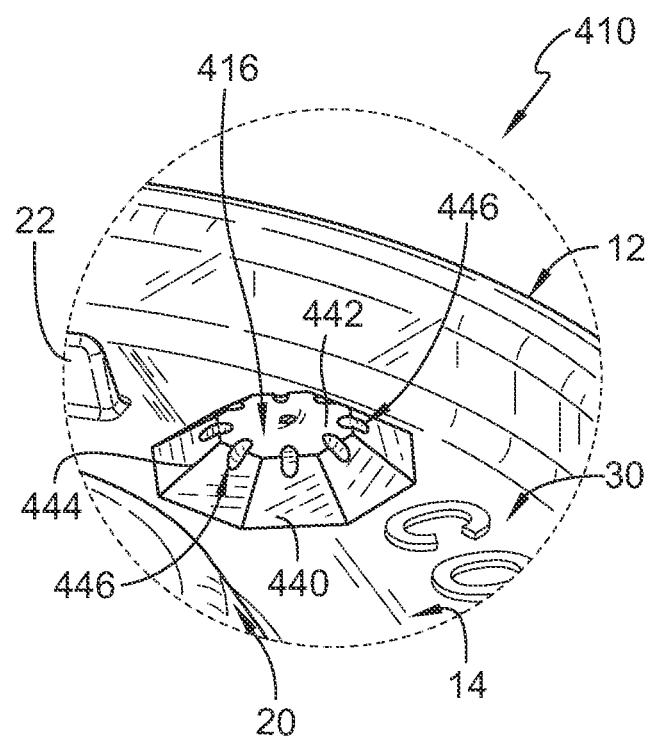
FIG. 11 is an enlarged partial perspective view of a fourth embodiment of a drink cup lid in accordance with the present disclosure showing that the drink cup lid includes a fourth embodiment of a product-identification dome.

Another embodiment of a drink cup lid 410 in accordance with the present disclosure is shown in FIG. 11. Drink cup lid 410 includes brim mount 12, central closure 14, and at least one deformable product-identification dome 416.

Product-identification dome 416 includes a plurality of panels 440 and a dome cap 442 as shown in FIG. 11. Panels 440 are appended to liquid-retainer floor 18 of central closure 14 and extend upwardly away from liquid-retainer floor 18 in a circular pattern. Dome cap 442 is located in spaced apart relation to liquid-retainer floor 18 and extends between and interconnect panels 440.

Deformable product-identification dome 416 includes eight panels 440 as shown in FIG. 11. Each panel 440 is trapezoidal. Dome cap 442 is octagon shaped and is coupled to each of the eight panels 440. Adjacent panels 440 are coupled to one another at stress concentrator joints 444. Panels 440 are further coupled to dome cap 442 at stress concentrator joints 444.

As shown in FIG. 11, deformable product-identification dome 416 includes a plurality of stress concentrator features 446. Stress concentrator features define wedge-shaped depressions 446 that extend into panels 440 and dome cap 442 toward central closure 14. In the illustrative embodiment, wedge-shaped depressions 446 are located at about a midpoint of each panel 440 and extend radially partway into dome cap 442 and partway down each panel 440 toward liquid-retainer floor 18. In the illustrative embodiment, each wedge-shaped depressions 446 has a width equal to about one-third of a width of one of the panels 440.

Figure 12:
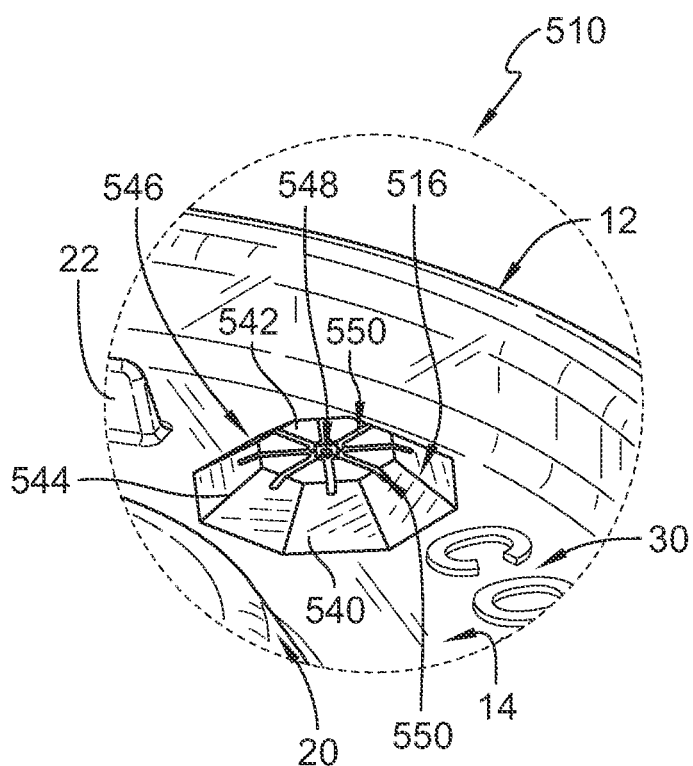
FIG. 12 is an enlarged partial perspective view of a fifth embodiment of a drink cup lid in accordance with the present disclosure showing that the drink cup lid includes a fifth embodiment of a product-identification dome.

Another embodiment of a drink cup lid 510 in accordance with the present disclosure is shown in FIG. 12. Drink cup lid 510 includes brim mount 12, central closure 14, and at least one deformable product-identification dome 516.

Product-identification dome 516 includes a plurality of panels 540 and a dome cap 542 as shown in FIG. 12. Panels 540 are appended to liquid-retainer floor 18 of central closure 14 and extend upwardly away from liquid-retainer floor 18 in a circular pattern. Dome cap 542 is located in spaced apart relation to liquid-retainer floor 18 and extends between and interconnect panels 540.

Deformable product-identification dome 516 includes eight panels 540 as shown in FIG. 12. Each panel 540 is trapezoidal. Dome cap 542 is octagon shaped and is coupled to each of the eight panels 540. Adjacent panels 540 are coupled to one another at stress concentrator joints 544. Panels 540 are further coupled to dome cap 542 at stress concentrator joints 544.

As shown in FIG. 12, deformable product-identification dome 516 includes a plurality of stress concentrator features 546. Stress concentrator features 546 include a central depression 548 formed in dome cap 542 and channels 550 that extend radially away from central depression 548. Central depression 548 is formed in about a center of dome cap 542. Channels 550 are arranged in a radial-spoke pattern around central depression 548. Each channel 550 extends into dome cap 542 toward central closure 14 and each channel 550 extends partway into a corresponding panel 540.

Figure 13:
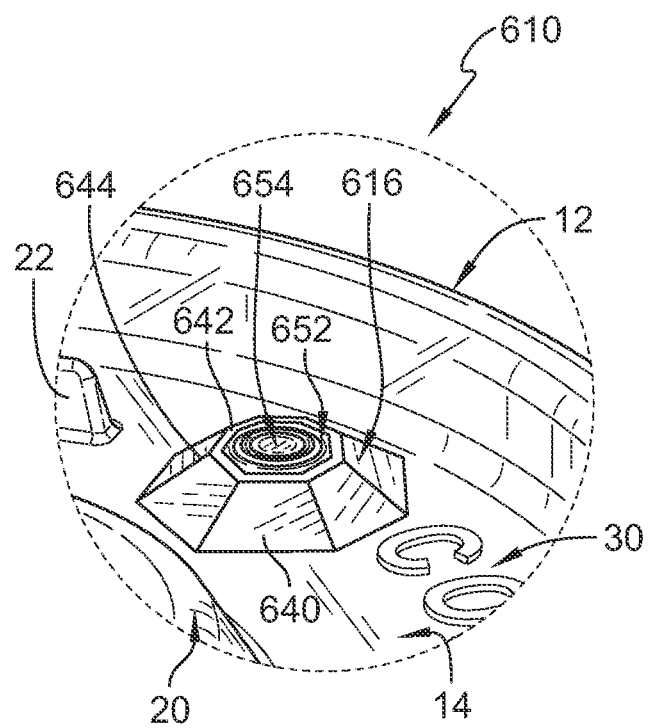
FIG. 13 is an enlarged partial perspective view of a sixth embodiment of a drink cup lid in accordance with the present disclosure showing that the drink cup lid includes a sixth embodiment of a product-identification dome.

Another embodiment of a drink cup lid 610 in accordance with the present disclosure is shown in FIG. 13. Drink cup lid 610 includes brim mount 12, central closure 14, and at least one deformable product-identification dome 616.

Product-identification dome 616 includes a plurality of panels 640 and a dome cap 642 as shown in FIG. 13. Panels 640 are appended to liquid-retainer floor 18 of central closure 14 and extend upwardly away from liquid-retainer floor 18 in a circular pattern. Dome cap 642 is located in spaced apart relation to liquid-retainer floor 18 and extends between and interconnect panels 640.

Deformable product-identification dome 616 includes eight panels 640 as shown in FIG. 13. Each panel 640 is trapezoidal. Dome cap 642 is octagon shaped and is coupled to each of the eight panels 640. Adjacent panels 640 are coupled to one another at stress concentrator joints 644. Panels 640 are further coupled to dome cap 642 at stress concentrator joints 644. As shown in FIG. 13, dome cap 642 is formed to include an annular depression 652 that extends downward into dome cap 642 toward central closure 14 to define a central circular shaped portion 654 of dome cap 642.

Another embodiment of a drink cup lid 710 in accordance with the present disclosure is shown in FIG. 14. Drink cup lid 710 includes brim mount 12, central closure 14, and at least one deformable product-identification dome 716. Deformable product-identification dome 716 is curved and appended to central closure 14. Illustratively, deformable product-identification dome 716 is hemispherical.

As shown in FIG. 14, deformable product-identification dome 716 lacks stress concentrator joints. Illustratively, deformable product-identification dome 716 may not change in transparency when moving from the un-deformed arrangement to the deformed arrangement. Furthermore, deformable product-identification dome 716 may not change in transparency when moving from the deformed arrangement to the un-deformed arrangement.

In other embodiments, deformable product-identification dome 716 has a relatively small change in transparency when moving from the deformed arrangement to the un-deformed arrangement as compared to other deformable product-identification domes 16, 216, 316, 416, 516, 616, 816, 916, 1016 that include stress concentrator joints. Any change in transparency in deformable product-identification dome 716 may be reversed when deformable product-identification dome 716 moves from the deformed arrangement to the un-deformed arrangement.

Figure 15:
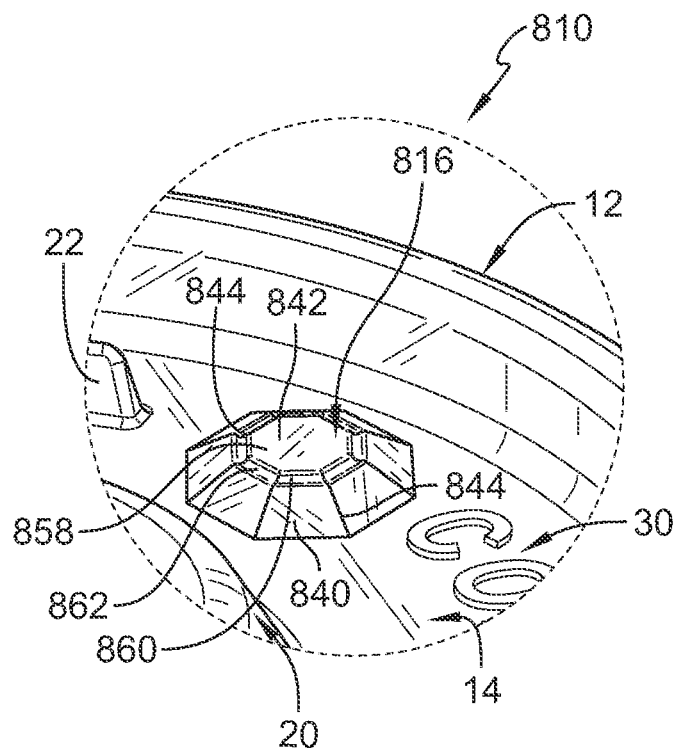
FIG. 15 is an enlarged partial perspective view of an eighth embodiment of a drink cup lid in accordance with the present disclosure showing that the drink cup lid includes an eighth embodiment of a product-identification dome.

Another embodiment of a drink cup lid 810 in accordance with the present disclosure is shown in FIG. 15. Drink cup lid 810 includes brim mount 12, central closure 14, and at least one deformable product-identification dome 816.

Product-identification dome 816 includes a plurality of panels 840 and a dome cap 842 as shown in FIG. 15. Panels 840 are appended to liquid-retainer floor 18 of central closure 14 and extend upwardly away from liquid-retainer floor 18 in a circular pattern. Dome cap 842 is located in spaced apart relation to liquid-retainer floor 18 and extends between and interconnects panels 840. Panels 840 are further coupled to dome cap 842 at stress concentrator joints 844.

Deformable product-identification dome 816 includes eight panels 840 as shown in FIG. 15. Each panel 840 is trapezoidal. Adjacent panels 840 are coupled to one another at stress concentrator joints 844. Stress concentrator joints 844 are linear in the illustrative embodiment.

Dome cap 842 is octagon shaped and is coupled to each of the eight panels 840 as shown in FIG. 15. Dome cap 842 includes an upper surface 858, a side surface 860, and a lower surface 862. Side surface 860 extends between and interconnects upper surface 858 and lower surface 862. Lower surface 862 may experience a greater reduction in transparency as compared to the side surface 862 and upper surface 858 when deformable product-identification dome 816 is depressed. Upper surface 858 and lower surface have octagonal perimeters.

Figure 16:
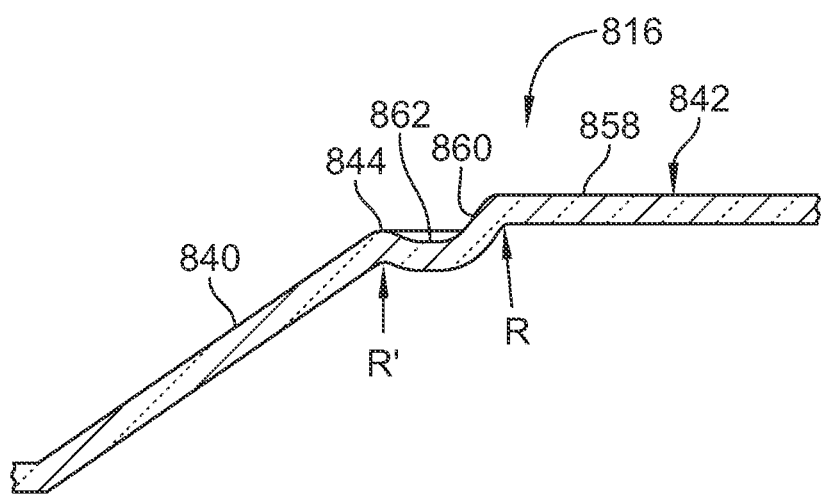
FIG. 16 is a partial section view of the eighth embodiment of the product-identification dome shown in FIG. 15 showing that features of the eighth embodiment of the product identification dome include rounded or curvilinear edges to reduce or eliminate cracking of the dome caused by deforming the dome.

Side surface 860 is coupled to upper surface 858 about a curved edge having a radius R as shown in FIG. 16. Lower surface 862 is coupled to and interconnects side surface 860 and each of the panels 840 about a curved edge having a radius R'. Radius R may be a constant radius or a varying radius of curvature. Radius R' may be a constant radius or a varying radius of curvature. The curved edges may minimize cracking of the material forming product-identification dome 816 at and around the edges even if product-identification dome 816 has never been depressed.

Figure 17:
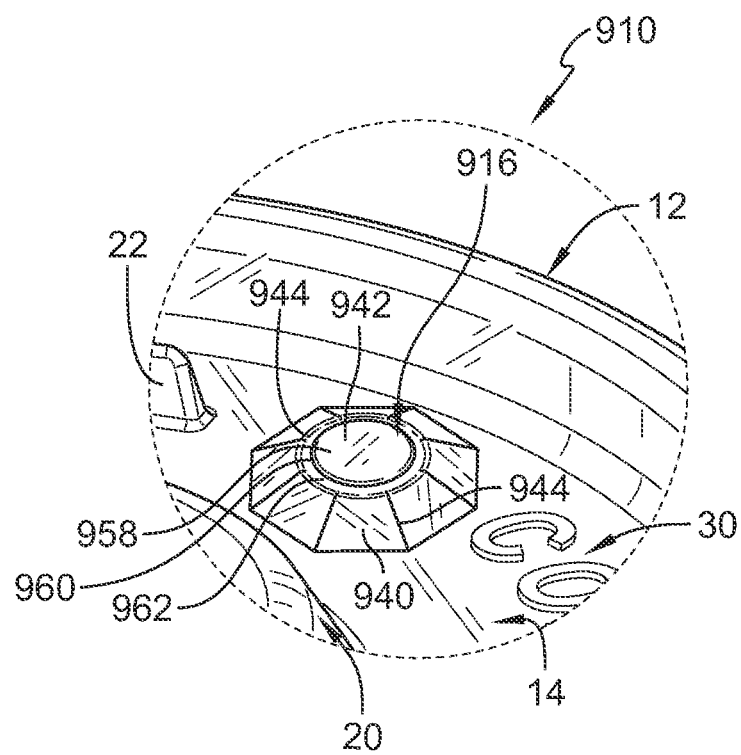
FIG. 17 is an enlarged partial perspective view of a ninth embodiment of a drink cup lid in accordance with the present disclosure showing that the drink cup lid includes a ninth embodiment of a product-identification dome.

Another embodiment of a drink cup lid 910 in accordance with the present disclosure is shown in FIG. 17. Drink cup lid 910 includes brim mount 12, central closure 14, and at least one deformable product-identification dome 916.

Product-identification dome 916 includes a plurality of panels 940 and a dome cap 942 as shown in FIG. 17. Panels 940 are appended to liquid-retainer floor 18 of central closure 14 and extend upwardly away from liquid-retainer floor 18 in a circular pattern. Dome cap 942 is located in spaced apart relation to liquid-retainer floor 18 and extends between and interconnects panels 940. Panels 940 are further coupled to dome cap 942 at stress concentrator joints 944.

Deformable product-identification dome 916 includes eight panels 940 as shown in FIG. 17. Each panel 940 is generally trapezoidal. Adjacent panels 940 are coupled to one another at linear stress concentrator joints 944.

Dome cap 942 is circular shaped and is coupled to each of the eight panels 940 as shown in FIG. 17. Dome cap 942 includes an upper surface 958, a side surface 960, and a lower surface 962. Side surface 960 extends between and interconnects upper surface 958 and lower surface 962. Upper surface 958 and lower surface have generally circular perimeters and are rounded at the edges to be curvilinear similar to FIG. 16. The curved edges may minimize cracking of the material forming product-identification dome 916 at and around the edges.

Figure 18:
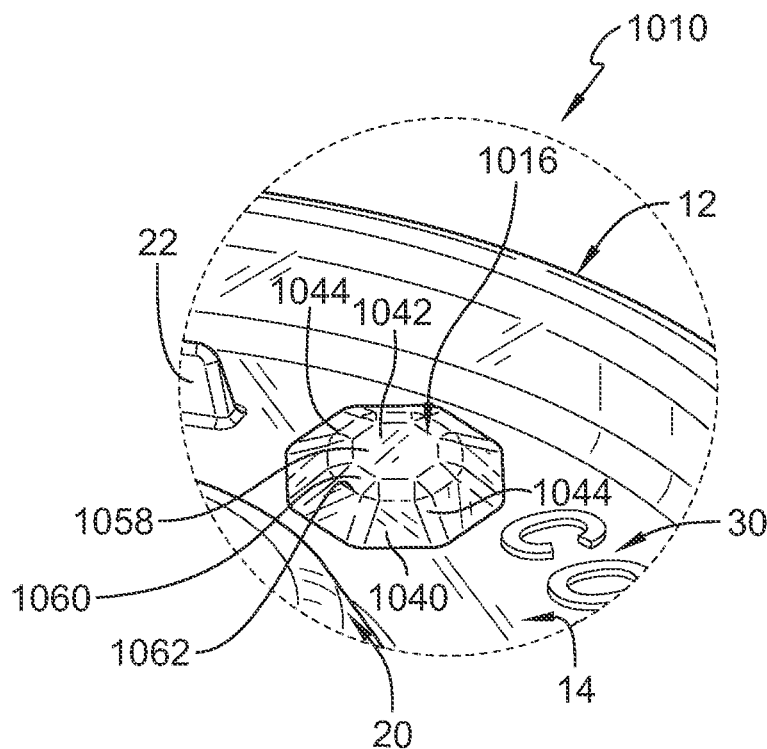
FIG. 18 is an enlarged partial perspective view of a tenth embodiment of a drink cup lid in accordance with the present disclosure showing that the drink cup lid includes a tenth embodiment of a product-identification dome.

Another embodiment of a drink cup lid 1010 in accordance with the present disclosure is shown in FIG. 18. Drink cup lid 1010 includes brim mount 12, central closure 14, and at least one deformable product-identification dome 1016.

Product-identification dome 1016 includes a plurality of panels 1040 and a dome cap 1042 as shown in FIG. 18. Panels 1040 are appended to liquid-retainer floor 18 of central closure 14 and extend upwardly away from liquid-retainer floor 18 in a circular pattern. Dome cap 1042 is located in spaced apart relation to liquid-retainer floor 18 and extends between and interconnects panels 1040. Panels 1040 are further coupled to dome cap 1042 at stress concentrator joints 1044.

Deformable product-identification dome 1016 includes eight panels 1040 as shown in FIG. 18. Each panel 1040 is generally trapezoidal. Adjacent panels 1040 are coupled to one another at curved stress concentrator joints 1044. Stress concentrator joints 1044 are curvilinear in the illustrative embodiment.

Dome cap 1042 is octagon shaped and is coupled to each of the eight panels 1040 as shown in FIG. 18. Dome cap 1042 includes an upper surface 1058, a side surface 1060, and a lower surface 1062. Side surface 1060 extends between and interconnects upper surface 1058 and lower surface 1062. Upper surface 1058 and lower surface have generally octagonal perimeters, but are rounded at the edges to be curvilinear. The curved edges may minimize cracking of the material forming product-identification dome 1016 at and around the edges.

Figure 19:
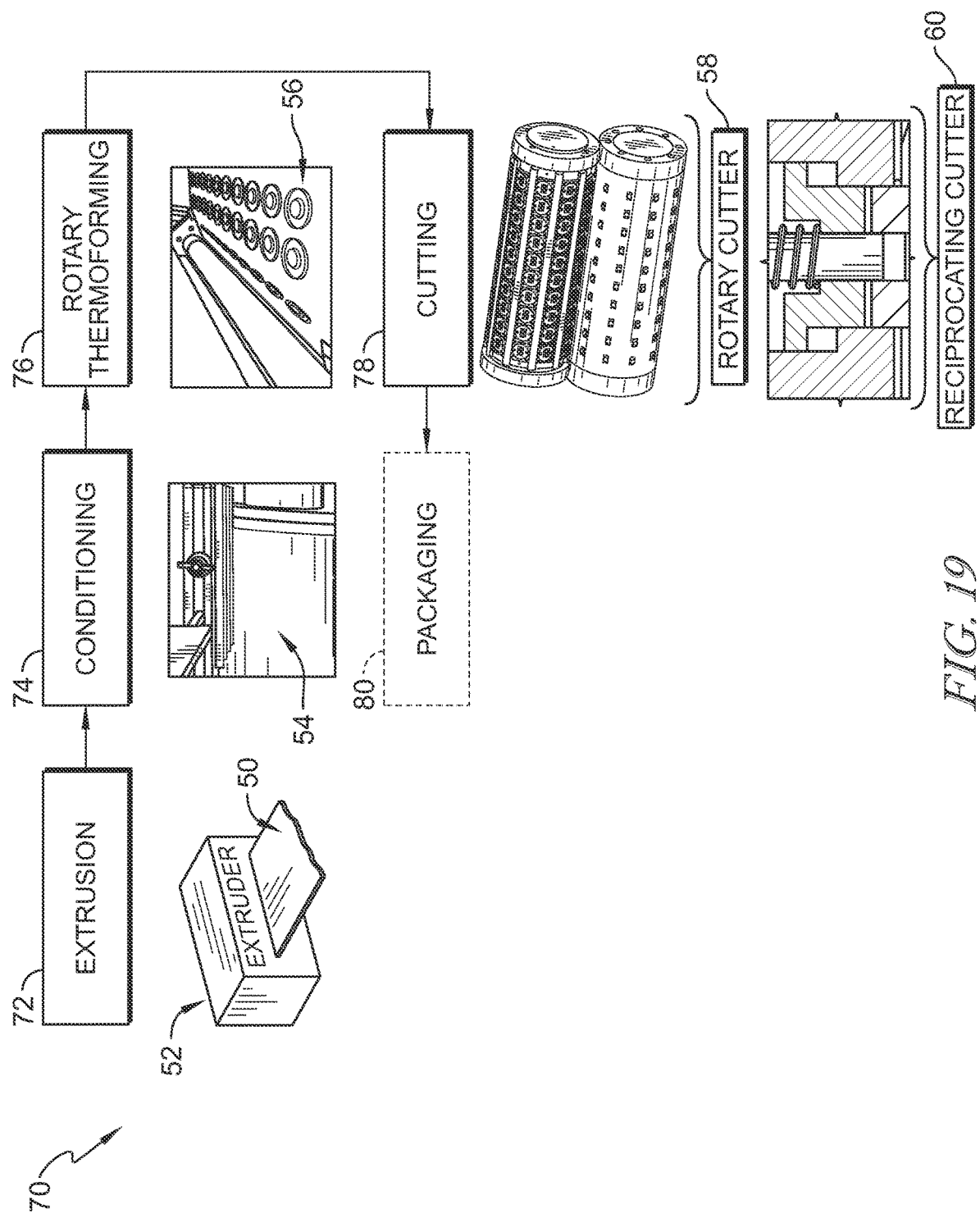
FIG. 19 is a diagrammatic view of a manufacturing process in accordance with the present disclosure for making an article such as the drink cup lid adapted to mate with a container and showing that the manufacturing process includes the stages of extruding a sheet comprising polymeric materials, conditioning the sheet, thermoforming the sheet, cutting the sheet to provide the lid, and packaging the lid for storage and transportation.

Drink cup lids 10, 210, 310, 410, 510, 610, 710, 810, 910, 1010 are made, for example, by thermoforming sheet 50 in a manufacturing process 70 for forming shallow draw articles in accordance with the illustrative embodiments of the present disclosure as suggested in FIG. 19. In other embodiments, article 10 may be formed using other processes such as deep draw thermoforming, blow molding, casting, flatbed thermoforming, etc. The lid-manufacturing process 70 may include an extruding stage 72, a conditioning stage 74, a thermoforming stage 76, a cutting stage 78, and a packaging stage 80. Reference is hereby made to U.S. application Ser. No. 16/057,122, filed Aug. 7, 2018 and titled METHOD AND APPARATUS FOR THERMOFORMING AN ARTICLE, for relating to a method of manufacturing articles, which application is hereby incorporated in its entirety.

Extrusion stage 72 provides sheet 50 of polymeric material via an extruder 52 as suggested in FIG. 19. Conditioning stage 74 applies sheet 50 to a conditioning roll 54 to establish a desired feed rate of sheet 50 while maintaining a desired transparency. Thermoforming stage 76 thermoforms sheet 50 to a thermoformer 56 to form webs in sheet 50. Cutting stage 78 cuts the webs in sheet 50 using a rotary cutter 58 or reciprocating cutter 60 to provide at least one article 10 such as lid 10. Optional packaging stage 80 packages a plurality of articles 10 for storage and transportation.

In illustrative embodiments, articles 10 are formed by rotary thermoforming sheet 50 onto a rotating rotor. Some articles 10 may be produced at a faster line speed rate with rotary thermoforming as compared to other thermoforming such as flatbed thermoforming for example.

In some embodiments, sheet 50 is a single-layer sheet that comprises a polymeric mixture. In other embodiments, sheet 50 is a multi-layer sheet. In one aspect, the polymeric mixture may be formed through an extrusion process of a formulation. In some embodiments, articles such as drink cup lids 10, 210, 310, 410, 510, 610, 710, 810, 910, 1010 are made from a polymeric non-aromatic sheet of material having a formulation.

Illustratively, the formulation for forming sheet 50 may be added to a hopper on the extrusion machine 52 and heated to produce a molten material in the extruder 52. The molten material may be extruded to produce single-layer sheet 50. In some embodiments, single-layer sheet 50 has a density between 0.8 $g/cm^3$ and 1.1 $g/cm^3$. In some embodiments, single-layer sheet 50 has a density of about 0.9 $g/cm^3$. In some embodiments, single-layer sheet 50 has a density of about 0.90 $g/cm^3$. In some embodiments, single-layer sheet 50 has a density of about 0.902 $g/cm^3$.

In illustrative embodiments, sheet 50 and article 10 such as drink cup lid 10 are transparent. In accordance with the present disclosure, the term transparent incorporates a range of transparency values including translucent to fully transparent values. Furthermore, the term transparent encompasses transmittance, wide angle scattering (sometimes referred to as haze), narrow angle scattering (sometimes referred to as clarity or see-through quality), and any other factor affecting the ability to see through sheet 50 and/or article 10.

The clarity of sheet 50 and article 10 such as drink cup lid 10, 210, 310, 410, 510, 610, 710, 810, 910, 1010 and articles 1110, 1210, 1310, 1410, 1510, 1610, 1710 as discussed herein is measured using ASTM D 1746 which is hereby incorporated by reference herein in its entirety. In some examples, the clarity of sheet 50 and/or article 10 is in a range of about 0% to about 100%. In some examples, the clarity of sheet 50 and/or article 10 is in a range of about 10% to about 100%. In some examples, the clarity of sheet 50 and/or article 10 is in a range of about 20% to about 100%. In some examples, the clarity of sheet 50 and/or article 10 is in a range of about 30% to about 100%. In some examples, the clarity of sheet 50 and/or article 10 is in a range of about 40% to about 100%.

In some examples, the clarity of sheet 50 and/or article 10 is in a range of about 10% to about 99%. In some examples, the clarity of sheet 50 and/or article 10 is in a range of about 20% to about 99%. In some examples, the clarity of sheet 50 and/or article 10 is in a range of about 30% to about 99%. In some examples, the clarity of sheet 50 and/or article 10 is in a range of about 40% to about 99%. In some examples, the clarity of sheet 50 and/or article 10 is in a range of about 50% to about 99%. In some examples, the clarity of sheet 50 and/or article 10 is in a range of about 60% to about 99%.

In some examples, the clarity of sheet 50 and/or article 10 is in a range of about 30% to about 95%. In some examples, the clarity of sheet 50 and/or article 10 is in a range of about 40% to about 95%. In some examples, the clarity of sheet 50 and/or article 10 is in a range of about 50% to about 95%. In some embodiments, the clarity of sheet 50 and/or article 10 is in a range of about 55% to about 95%. In some embodiments, the clarity of sheet 50 and/or article 10 is in a range of about 60% to about 95%. In some embodiments, the clarity of sheet 50 and/or article 10 is in a range of about 55% to about 65%. In some embodiments, the clarity of sheet 50 and/or article 10 is in a range of about 65% to about 75%.

In some embodiments, the clarity of sheet 50 and and/or article 10 is in a range of about 70% to about 95%. In some embodiments, the clarity of sheet 50 and/or article 10 is in a range of about 70% to about 90%. In some embodiments, the clarity of sheet 50 and/or article 10 is in a range of about 70% to about 85%. In some embodiments, the clarity of sheet 50 and/or article 10 is in a range of about 70% to about 80%. In some embodiments, the clarity of sheet 50 and/or article 10 is in a range of about 65% to about 85%. In some embodiments, the clarity of sheet 50 and/or article 10 is in a range of about 50% to about 70%. In some embodiments, the clarity of sheet 50 and/or article 10 is in a range of about 53% to about 68%. In some embodiments, the clarity of sheet 50 and/or article 10 is in a range of about 60% to about 70%.

In some examples, the clarity of sheet 50 and/or article 10 is in a range of about 0% to about 50%. In some examples, the clarity of sheet 50 and/or article 10 is in a range of about 10% to about 50%. In some examples, the clarity of sheet 50 and/or article 10 is in a range of about 20% to about 50%. In some examples, the clarity of sheet 50 and/or article 10 is in a range of about 30% to about 50%. In some examples, the clarity of sheet 50 and/or article 10 is in a range of about 40% to about 50%. In some examples, the clarity of sheet 50 and/or article 10 is in a range of about 10% to about 40%. In some examples, the clarity of sheet 50 and/or article 10 is in a range of about 20% to about 40%. In some examples, the clarity of sheet 50 and/or article 10 is in a range of about 10% to about 30%. In some examples, the clarity of sheet 50 and/or article 10 is in a range of about 20% to about 30%. In some examples, the clarity of sheet 50 and/or article 10 is in a range of about 0% to about 10%.

In illustrative embodiments, the clarity of sheet 50 and/or article 10 is greater than about 70%. In some embodiments, the clarity of sheet 50 and/or article 10 is greater than about 60%. In some embodiments, the clarity of sheet 50 and/or article 10 is greater than about 65%. In some embodiments, the clarity of sheet 50 and/or article 10 is greater than about 75%. In some embodiments, the clarity of sheet 50 and/or article 10 is greater than about 50%. In some embodiments, the clarity of sheet 50 and/or article 10 is greater than about 80%. In some embodiments, the clarity of sheet 50 and/or article 10 is greater than about 90%. In some embodiments, the clarity of sheet 50 and/or article 10 is greater than about 40%. In some embodiments, the clarity of sheet 50 and/or article 10 is greater than about 30%. In some embodiments, the clarity of sheet 50 and/or article 10 is greater than about 20%. In some embodiments, the clarity of sheet 50 and/or article 10 is greater than about 10%.

In some examples, the clarity of sheet 50 and/or article 10 is about 68%. In some examples, the clarity of sheet 50 and/or article 10 is about 61%. In some examples, the clarity of sheet 50 and/or article 10 is about 60%. In some examples, the clarity of sheet 50 and/or article 10 is about 59%. In some examples, the clarity of sheet 50 and/or article 10 is about 56.2%. In some examples, the clarity of sheet 50 and/or article 10 is about 58.5%. In some examples, the clarity of sheet 50 and/or article 10 is about 53%. In some examples, the clarity of sheet 50 and/or article 10 is about 63.7%. In some examples, the clarity of sheet 50 and/or article 10 is about 60.2%. In some examples, the clarity of sheet 50 and/or article 10 is about 70.2%. In some examples, the clarity of sheet 50 and/or article 10 is about 80.9%. In some examples, the clarity of sheet 50 and/or article 10 is about 94.8%. In some examples, the clarity of sheet 50 and/or article 10 is about 74.2%. In some examples, the clarity of sheet 50 and/or article 10 is about 71.2%. In some examples, the clarity of sheet 50 and/or article 10 is about 70.3%. In some examples, the clarity of sheet 50 and/or article 10 is about 65.8%.

The haze of sheet 50 and article 10 as discussed herein is measured using ASTM D 1003 procedure B which is hereby incorporated by reference herein in its entirety. In some examples, the haze of sheet 50 and/or article 10 is in a range of about 0% to about 60%. In some examples, the haze of sheet 50 and/or article 10 is in a range of about 0% to about 100%. In some examples, the haze of sheet 50 and/or article 10 is in a range of about 50% to about 100%. In some examples, the haze of sheet 50 and/or article 10 is in a range of about 60% to about 95%. In some examples, the haze of sheet 50 and/or article 10 is in a range of about 50% to about 90%. In some examples, the haze of sheet 50 and/or article 10 is in a range of about 40% to about 60%. In some examples, the haze of sheet 50 and/or article 10 is in a range of about 50% to about 70%. In some examples, the haze of sheet 50 and/or article 10 is in a range of about 60% to about 80%.

In some examples, the haze of sheet 50 and/or article 10 is in a range of about 5% to about 60%. In some examples, the haze of sheet 50 and/or article 10 is in a range of about 10% to about 60%. In some examples, the haze of sheet 50 and/or article 10 is in a range of about 5% to about 40%. In some examples, the haze of sheet 50 and/or article 10 is in a range of about 10% to about 40%. In some examples, the haze of sheet 50 and/or article 10 is in a range of about 20% to about 38%. In some examples, the haze of sheet 50 and/or article 10 is in a range of about 20% to about 40%. In some examples, the haze of sheet 50 and/or article 10 is in a range of about 30% to about 40%. In some examples, the haze of sheet 50 and/or article 10 is in a range of about 30% to about 50%. In some examples, the haze of sheet 50 and/or article 10 is in a range of about 14% to about 25%. In some examples, the haze of sheet 50 and/or article 10 is in a range of about 0% to about 30%. In some examples, the haze of sheet 50 and/or article 10 is in a range of about 10% to about 30%. In some examples, the haze of sheet 50 and/or article 10 is in a range of about 20% to about 28%.

In illustrative embodiments, the haze of sheet 50 and/or article 10 is less than about 40%. In some embodiments, the haze of sheet 50 and/or article 10 is less than about 30%. In some embodiments, the haze of sheet 50 and/or article 10 is less than about 29%. In illustrative embodiments, the haze of sheet 50 and/or article 10 is less than about 28%. In some embodiments, the haze of sheet 50 and/or article 10 is less than about 50%. In some embodiments, the haze of sheet 50 and/or article 10 is less than about 60%. In some embodiments, the haze of sheet 50 and/or article 10 is less than about 70%. In some embodiments, the haze of sheet 50 and/or article 10 is less than about 80%. In some embodiments, the haze of sheet 50 and/or article 10 is less than about 90%. In some embodiments, the haze of sheet 50 and/or article 10 is less than about 95%.

In some examples, the haze of sheet 50 and/or article 10 is about 46%. In some examples, the haze of sheet 50 and/or article 10 is about 41%. In some examples, the haze of sheet 50 and/or article 10 is about 39%. In some examples, the haze of sheet 50 and/or article 10 is about 31%. In some examples, the haze of sheet 50 and/or article 10 is about 36.9%. In some examples, the haze of sheet 50 and/or article 10 is about 23.0%. In some examples, the haze of sheet 50 and/or article 10 is about 21.5%. In some examples, the haze of sheet 50 and/or article 10 is about 20.2%. In some examples, the haze of sheet 50 and/or article 10 is about 23.5%. In some examples, the haze of sheet 50 and/or article 10 is about 18.8%. In some examples, the haze of sheet 50 and/or article 10 is about 14.1%. In some examples, the haze of sheet 50 and/or article 10 is about 28.3%. In some examples, the haze of sheet 50 and/or article 10 is about 31.4%. In some examples, the haze of sheet 50 and/or article 10 is about 32.4%. In some examples, the haze of sheet 50 and/or article 10 is about 32.8%.

In some examples, the clarity of sheet 50 and/or article 10 is greater than about 70% and the haze is less than about 30%. In some examples, the clarity of sheet 50 and/or article 10 is about 74.2% and the haze is about 28.3%. In some examples, the clarity of sheet 50 and/or article 10 is equal to or greater than about 60% and the haze is less than about 40%. In some examples, the clarity of sheet 50 and/or article 10 is equal to or greater than about 53% and the haze is about equal to or less than about 46%. In some examples, the clarity of sheet 50 and/or article 10 is equal to about 59% and the haze is about equal to about 41%. In some examples, the clarity of sheet 50 and/or article 10 is equal to about 61% and the haze is about equal to about 39%.

Article 10 is transparent and has a surface roughness of between about 5 Ra (microinches) and about 40 Ra (microinches) in some embodiments. Article 10 is transparent and has a surface roughness of between about 10 Ra (microinches) and about 30 Ra (microinches) in some embodiments. Article 10 is transparent and has a surface roughness of between about 10 Ra (microinches) and about 20 Ra (microinches) in some embodiments. Illustratively, article 10 has a surface roughness of between about 13 Ra (microinches) and about 16 Ra (microinches) in some embodiments. Article 10 has a surface roughness of about 13.6 Ra (microinches) in some embodiments. Article 10 has a surface roughness of about 13 Ra (microinches) in some embodiments. Article 10 has a surface roughness of about 15.6 Ra (microinches) in some embodiments. Article 10 has a surface roughness of about 15 Ra (microinches) in some embodiments. Article 10 has a surface roughness of about 14.8 Ra (microinches) in some embodiments.

In some embodiments, sheet 50 and article 10 have a thickness of between about five and about twenty thousandths of an inch. In some embodiments, sheet 50 and article 10 have a thickness of between about five and about fifteen thousandths of an inch. In some embodiments, sheet 50 and article 10 have a thickness of between about ten and about eleven thousandths of an inch. In some embodiments, sheet 50 and article 10 have a thickness of between about one and about fifteen thousandths of an inch. In some embodiments, sheet 50 and article 10 have a thickness of between about one and about nine thousandths of an inch. In some embodiments, sheet 50 and article 10 have a thickness of about six thousandths of an inch. In some embodiments, sheet 50 and article 10 have a thickness of about nine thousandths of an inch. In some embodiments, sheet 50 and article 10 have a thickness of between about eight and about nine thousandths of an inch.

Sheet 50 and article 10 are made of non-aromatic materials in some embodiments. As such, sheet 50 and article 10 are free from polystyrene. Sheet 50 and article 10 are free from aromatic materials. As used herein, the term non-aromatic polymer refers to a polymer that is devoid of aromatic ring structures (e.g., phenyl groups) in its polymer chain. In some embodiments, sheet 50 and article 10 are substantially free of aromatic materials. In some embodiments, sheet 50 and article 10 include about or less than about 10% by weight aromatic materials. In some embodiments, sheet 50 and article 10 include about or less than about 5% by weight aromatic materials. In some embodiments, sheet 50 and article 10 include about or less than about 3% by weight aromatic materials. In some embodiments, sheet 50 and article 10 include about or less than about 1% by weight aromatic materials.

Aromatic molecules typically display enhanced hydrophobicity when compared to non-aromatic molecules. As a result, it would be expected that a polypropylene-based polymeric material instead of a polystyrene-based polymeric material would result in a change in hydrophobicity with a concomitant, but not necessarily predictable or desirable, change in surface adsorption properties of the resulting material. In addition, by virtue of the hydrocarbon chain in polystyrene, wherein alternating carbon centers are attached to phenyl groups, neighboring phenyl groups can engage in so-called pi-stacking, which is a mechanism contributing to the high intramolecular strength of polystyrene and other aromatic polymers. No similar mechanism is available for non-aromatic polymers such as polypropylene. Moreover, notwithstanding similar chemical reactivity and chemical resistance properties of polystyrene and polypropylene, polystyrene can be either thermosetting or thermoplastic when manufactured whereas polypropylene is exclusively thermoplastic. As a result, to the extent that surface adsorption properties, manufacturing options, and strength properties similar to those of polystyrene are sought, likely alternatives to polystyrene-based polymeric materials would be found in another aromatic polymer rather than in a non-aromatic polymer.

The use of non-aromatic materials may affect recyclability, insulation, microwavability, impact resistance, or other properties. At least one potential feature of an article formed of non-aromatic polymeric material according to various aspects of the present disclosure is that the article can be recycled. Recyclable means that a material can be added (such as regrind) back into an extrusion or other formation process without segregation of components of the material, i.e., an article formed of the material does not have to be manipulated to remove one or more materials or components prior to re-entering the extrusion process. In contrast, a polystyrene lid may not be recyclable. In one example, a lid and a cup made from non-aromatic or styrene-free materials may simplify recycling.

The polymeric mixture of sheet 50 may comprise, for example, a plastic polymer, a material, or a resin, and may optionally include one or more additives. Examples of plastic polymers, resins, or materials suitable for single-layer sheet 50 include high density polyethylene (HDPE), low density polyethylene (LDPE), polypropylene (PP), and copolymers of any combination of ethylene, propylene, butylene, and any other suitable alpha-olefin. In some aspects, the plastic polymer, material, or resin may be called a base resin. Reference is hereby made to U.S. Provisional application Ser. No. 15/946,023 filed Apr. 5, 2018 and entitled DRINK CUP LID for disclosure relating to formulations of sheets, which application is hereby incorporated in its entirety herein In one aspect, the polypropylene may be a polypropylene homopolymer, a polypropylene copolymer, a polypropylene impact copolymer, or combinations thereof. In some embodiments, the polypropylene may contain an additive. In some aspects, the polypropylene copolymer is a random copolymer.

In some examples, sheet 50 and article 10 comprise a polymeric mixture comprising a first polypropylene and a second polypropylene. In some examples, the first polypropylene may be a polypropylene impact copolymer. In some embodiments, the first polypropylene comprises rubber, but is not considered to be a polypropylene impact copolymer. In some embodiments, the first polypropylene comprises rubber mixed with a polypropylene homopolymer or copolymer. In some examples, the second polypropylene may be a homopolymer. In some examples, sheet 50 comprises a first polypropylene, a second polypropylene, and a polypropylene random copolymer. The formulation and percent by weight of resins is described below with regards to sheet 50. Article 10 is formed from sheet 50 in some embodiments and, thus, the formulations and percentages by weight of the resins apply to article 10.

In some examples, a polypropylene impact copolymer comprises a copolymer of ethylene and propylene. Illustratively, a polypropylene impact copolymer may be consistent with ISO 19069-1, 2015, "Plastics-Polypropylene (PP) moulding and extrusion materials," the disclosure of which is hereby incorporated by reference in its entirety. In some examples, a polypropylene impact copolymer is a heterophasic in-situ blend comprising an ethylene/propylene rubber (EPR) component. In some examples, a polypropylene impact copolymer is a heterophasic in-situ blend comprising an ethylene/propylene rubber (EPR) component distributed inside a semi-crystalline polypropylene homopolymer matrix. Illustratively, a polypropylene impact copolymer comprises a rubber phase and a polypropylene homopolymer matrix phase. In some examples, a polypropylene impact copolymer may be produced with a Ziegler Natta catalyst. In some examples, a polypropylene impact copolymer is a semi-crystalline thermoplastic resin. In some examples, the polypropylene impact copolymer contains a nucleating agent. In some examples, the polypropylene impact copolymer is LyondellBasell Pro-fax™ SC204.

In some examples, the polypropylene homopolymer may be a high crystallinity homopolymer. In some examples, the polypropylene homopolymer may comprise a nucleating agent. In some examples, the polypropylene homopolymer is Braskem INSPIRE™ 6025N.

In some embodiments, sheet 50 has a rubber content up to about 50% by weight of the sheet. In some embodiments, sheet 50 comprises at least 0.05%, 1%, 2%, 3%, 4%, 5%, 6%, 7%, 8%, 9%, 10%, 12%, 14%, 16%, 18%, 20%, 25%, 30%, 35%, or 40% by weight rubber. In some embodiments, the rubber content of sheet 50 can be selected from a first series of ranges of about 0.5% to about 50%, about 0.5% to about 40%, about 0.5% to about 30%, about 0.5% to about 20%, about 0.5% to about 18%, about 0.5% to about 16%, about 0.5% to about 10%, or about 0.5% to about 5% by weight of the single-layer sheet. In some embodiments, the rubber content of sheet 50 can be selected from a second series of ranges of about 0.5% to about 20%, about 1% to about 20%, about 2% to about 20%, about 2.5% to about 20%, about 2.5% to about 20%, about 3% to about 20%, about 3.5% to about 20%, about 4% to about 20%, about 4.5% to about 20%, about 5% to about 20%, about 6% to about 20%, or about 7% to about 20% by weight of the sheet. In some embodiments, the rubber content of sheet 50 can be selected from a third series of ranges of about 0.5% to about 20%, about 1% to about 20%, about 1.5% to about 20%, about 2% to about 20%, about 2% to about 15%, about 2% to about 10%, about 2% to about 8%, or about 2% to about 5% by weight of the single-layer sheet. In some examples, the rubber content is about 0.5%, about 1%, about 1.5%, about 2%, about 2.5%, about 3%, about 3.5% about 4%, about 4.5% about 5%, about 6%, about 7%, about 7.5%, about 8%, about 8.5%, about 9%, about 9.5%, about 10%, about 12%, about 14%, about 16%, about 18%, about 20%, about 25%, about 30%, about 35%, about 40%, about 45%, or about 50% by weight of the sheet.

In some examples, sheet 50 comprises a polymeric mixture comprising a base resin and a secondary resin, also called a first resin and a second resin. Illustratively, sheet 50 may comprise up to 100% of the first resin by weight of sheet. Illustratively, sheet 50 may comprise up to 99% the first resin by weight of sheet. In some examples, sheet 50 may comprise up to 99% of the second resin by weight of sheet. In some examples, the amount of first resin may be selected from a first series of ranges of about 0% to about 100%, about 5% to about 100%, about 10% to about 100%, about 20% to about 100%, about 25% to about 100%, about 30% to about 100%, about 35% to about 100%, about 40% to about 100%, about 45% to about 100%, about 50% to about 100%, about 55% to about 100%, about 60% to about 100%, about 65% to about 100%, about 65% to about 100%, about 70%, to about 100%, about 75% to about 100%, about 80% to about 100%, about 85% to about 100%, about 90% to about 100%, and about 95% to about 100% by weight of sheet.

In some examples, the amount of first resin may be selected from a second series of ranges of about 0% to about 95%, about 0% to about 90%, about 0% to about 85%, about 0% to about 80%, about 0% to about 75%, about 0% to about 70%, about 0% to about 65%, about 0% to about 60%, about 0% to about 55%, about 0% to about 50%, about 0% to about 45%, about 0% to about 40%, about 0% to about 35%, about 0% to about 30%, about 0% to about 25%, about 0% to about 20%, about 0% to about 15%, about 0% to about 10%, and about 0% to about 5% by weight of sheet. In some examples, the amount of base resin may be selected from a third series of ranges of about 50% to about 90%, about 50% to about 85%, about 50% to about 80%, about 50% to about 75%, about 50% to about 70%, about 50% to about 65%, and about 55% to about 60% by weight of sheet. In some examples, the amount of first resin may be selected from a fourth series of ranges of about 55% to about 65%, about 55% to about 70%, about 55% to about 75%, about 55% to about 80%, about 55% to about 85%, about 55% to about 90%, and about 55% to about 95% by weight of sheet.

In some examples, the amount of first resin may be selected from a fifth series of ranges of about 60% to about 65%, about 60% to about 70%, about 60% to about 75%, about 60% to about 80%, about 60% to about 85%, about 60% to about 90%, and about 60% to about 95% by weight of sheet. In some examples, the amount of first resin may be selected from a sixth series of ranges of about 65% to about 70%, about 65% to about 75%, about 65% to about 80%, about 65% to about 85%, about 65% to about 90%, and about 65% to about 95% by weight of sheet. In some example, the amount of first resin may be selected from a seventh series of ranges of about 35% to about 95%, about 40% to about 90%, about 45% to about 85%, about 50% to about 80%, about 55% to about 75%, and about 60% to about 70% by weight of sheet. In some example, the amount of first resin may be selected from an eighth series of ranges of about 10% to about 95%, about 55% to about 100%, about 10% to about 85%, about 20% to about 85%, about 20% to about 75%, about 30% to about 75%, about 40% to about 75%, about 55% to about 75%, about 65% to about 75%, or about 40% to about 60% by weight of sheet. In some embodiments, sheet 50 may comprise an amount of base resin selected from a range of about 15% to about 75%, about 15% to about 65%, about 15% to about 50%, about 20% to about 50%, or about 25% to about 45% by weight of sheet. Sheet 50 may comprise an amount of first resin of about 5%, about 10%, about 15%, about 20%, about 25%, about 30%, about 35%, about 40%, about 45%, about 48%, about 49%, about 50%, about 51%, about 52%, about 55%, about 60%, about 65%, about 70%, about 80%, about 95%, or about 100% by weight of sheet.

Sheet 50 may comprise an amount of secondary resin, also called second resin, from a first series of ranges of about 0% to about 100%, about 5% to about 100%, about 10% to about 100%, about 20% to about 100%, about 25% to about 100%, about 30% to about 100%, about 35% to about 100%, about 40% to about 100%, about 45% to about 100%, about 50% to about 100%, about 55% to about 100%, about 60% to about 100%, about 65% to about 100%, about 65% to about 100%, about 70%, to about 100%, about 75% to about 100%, about 80% to about 100%, about 85% to about 100%, about 90% to about 100%, and about 95% to about 100% by weight of sheet.

In some examples, the amount of second resin may be selected from a second series of ranges of about 0% to about 95%, about 0% to about 90%, about 0% to about 85%, about 0% to about 80%, about 0% to about 75%, about 0% to about 70%, about 0% to about 65%, about 0% to about 60%, about 0% to about 55%, about 0% to about 50%, about 0% to about 45%, about 0% to about 40%, about 0% to about 35%, about 0% to about 30%, about 0% to about 25%, about 0% to about 20%, about 0% to about 15%, about 0% to about 10%, and about 0% to about 5% by weight of sheet. In some examples, the amount of second resin may be selected from a third series of ranges of about 5% to about 10%, about 5% to about 15%, about 5% to about 20%, about 5% to about 20%, about 5% to about 25%, about 5% to about 30%, about 5% to about 35%, about 5% to about 40%, about 5% to about 45%, and about 5% to about 50% by weight of sheet. In some examples, the amount of second resin may be selected from a fourth series of ranges of about 55% to about 65%, about 55% to about 70%, about 55% to about 75%, about 55% to about 80%, about 55% to about 85%, about 55% to about 90%, and about 55% to about 95% by weight of sheet.

In some examples, the amount of second resin may be selected from a fifth series of ranges of about 20% to about 25%, about 20% to about 30%, about 20% to about 35%, about 20% to about 40%, and about 20% to about 45% by weight of sheet. In some examples, the amount of second resin may be selected from a sixth series of ranges of about 25% to about 30%, about 25% to about 35%, about 25% to about 40%, about 25% to about 45%, and about 25% to about 50% by weight of sheet. In some example, the amount of second resin may be selected from a seventh series of ranges of about 10% to about 50%, about 15% to about 45%, about 20% to about 40%, about 25% to about 40%, and about 30% to about 40 by weight of sheet. In some examples, the amount of second resin may be selected from an eighth series of ranges of selected from a range of about 5% to about 95%, about 10% to about 95%, about 10% to about 85%, about 20% to about 85%, about 20% to about 75%, about 25% to about 70%, about 30% to about 75%, about 40% to about 75%, about 45% to about 65%, about 25% to about 35%, or about 40% to about 60% by weight of sheet. In some example, the amount of second resin may be selected from a ninth series of ranges of selected from a range of about 15% to about 75%, about 15% to about 65%, about 15% to about 50%, about 20% to about 50%, or about 25% to about 45% by weight of sheet. Sheet 50 may comprise an amount of second resin of about 5%, about 10%, about 15%, about 20%, about 25%, about 30%, about 35%, about 40%, about 45%, about 48%, about 49%, about 50%, about 51%, about 52%, about 55%, about 60%, about 65%, about 70%, about 80%, or about 95% by weight of sheet.

In some examples, sheet 50 comprises about 50% base resin and about 50% secondary resin by weight of the sheet. In some examples, sheet 50 comprises about 49% base resin and about 50% secondary resin by weight of the sheet. In some examples, single-layer sheet 50 comprises about 55% base resin and about 35% secondary resin by weight of the sheet. In some examples, sheet 50 comprises about 100% base resin and about 0% secondary resin by weight of the sheet. In some examples, sheet 50 comprises about 65% base resin and about 35% secondary resin by weight of the sheet. In some examples, sheet 50 comprises about 75% base resin and about 25% secondary resin by weight of the sheet. In some examples, sheet 50 comprises about 55% base resin and about 25% secondary resin by weight of the sheet. In some examples, sheet 50 comprises about 55% base resin and about 35% secondary resin by weight of the sheet.

In some embodiments, the base resin is a polypropylene. In some embodiments, the secondary resin is a polypropylene. In some examples both the base resin and the secondary resin are a polypropylene. In illustrative embodiments, the base resin is a polypropylene impact copolymer. In illustrative embodiments, the secondary resin is a polypropylene homopolymer.

In some examples, sheet 50 comprises a polymeric mixture comprising a polypropylene homopolymer and a polypropylene impact copolymer. Illustratively, the sheet may comprise up to 99% polypropylene homopolymer by weight of the sheet. In some examples, the sheet may comprise up to 99% polypropylene impact copolymer by weight of the sheet. In some examples, the sheet may comprise up to 100% polypropylene impact copolymer by weight of the sheet. In some embodiments, sheet 50 comprises no polypropylene homopolymer. In some embodiments, the sheet 50 comprises substantially no polypropylene homopolymer.

Sheet 50 may comprise an amount of polypropylene homopolymer selected from a range of about 5% to about 95%, about 10% to about 95%, about 10% to about 85%, about 20% to about 85%, about 20% to about 75%, about 25% to about 35%, about 30% to about 75%, about 40% to about 75%, or about 40% to about 60% by weight of sheet. In some embodiments, sheet 50 may comprise an amount of polypropylene homopolymer selected from a range of about 15% to about 75%, about 15% to about 65%, about 15% to about 50%, about 20% to about 50%, or about 25% to about 45% by weight of sheet. Sheet 50 may comprise an amount of polypropylene homopolymer of about 5%, about 10%, about 15%, about 20%, about 25%, about 30%, about 35%, about 40%, about 45%, about 48%, about 49%, about 50%, about 51%, about 52%, about 55%, about 60%, about 65%, about 70%, about 80%, or about 95% by weight of sheet.

Sheet 50 may comprise an amount of polypropylene impact copolymer selected from a range of 0% to about 100%, about 5% to about 95%, about 10% to about 95%, about 10% to about 85%, about 20% to about 85%, about 20% to about 75%, about 25% to about 70%, about 30% to about 75%, about 40% to about 75%, about 45% to about 65%, about 55% to about 75%, about 55% to about 65%, about 65% to about 75%, or about 40% to about 60% by weight of sheet. Sheet 50 may comprise an amount of polypropylene impact copolymer of about 5%, about 10%, about 15%, about 20%, about 25%, about 30%, about 35%, about 40%, about 45%, about 48%, about 49%, about 50%, about 51%, about 52%, about 55%, about 60%, about 65%, about 70%, about 80%, about 85%, about 90%, about 95%, or about 100% by weight of sheet.

In some examples, sheet 50 comprises about 50% polypropylene homopolymer and about 50% polypropylene impact copolymer by weight of the sheet. In some examples, sheet 50 comprises about 50% polypropylene homopolymer and about 49% polypropylene impact copolymer by weight of the sheet. In some examples, sheet 50 comprises about 35% polypropylene homopolymer and about 55% polypropylene impact copolymer by weight of the sheet. In some examples, sheet 40 comprises about 35% polypropylene homopolymer and about 65% polypropylene impact copolymer by weight of the sheet. In some examples, sheet 50 comprises about 25% polypropylene homopolymer and about 75% polypropylene impact copolymer by weight of the sheet. In some examples, sheet 50 comprises about 25% polypropylene homopolymer and about 55% polypropylene impact copolymer by weight of the sheet. In some examples, sheet 50 comprises about 0% polypropylene homopolymer and about 100% polypropylene impact copolymer by weight of the sheet.

In some examples, sheet 50 comprises about 95% or less polypropylene impact copolymer by weight of the sheet. In some examples, sheet 50 comprises about 90% or less polypropylene impact copolymer by weight of the sheet. In some examples, sheet 50 comprises about 80% or less polypropylene impact copolymer by weight of the sheet. In some examples, sheet 50 comprises about 70% or less polypropylene impact copolymer by weight of the sheet. In some examples, sheet 50 comprises about 60% or less polypropylene impact copolymer by weight of the sheet. In some examples, sheet 50 comprises about 50% or less polypropylene impact copolymer by weight of the sheet. In some examples, sheet 50 comprises about 40% or less polypropylene impact copolymer by weight of the sheet. In some examples, sheet 50 comprises about 30% or less polypropylene impact copolymer by weight of the sheet. In some examples, sheet 50 comprises about 20% or less polypropylene impact copolymer by weight of the sheet. In some examples, sheet 50 comprises about 10% or less polypropylene impact copolymer by weight of the sheet. In some examples, sheet 50 comprises about 5% or less polypropylene impact copolymer by weight of the sheet.

In some embodiments, sheet 50 has a rubber content up to about 50% by weight of sheet. In some embodiments, sheet 50 comprises at least 0.05%, 1%, 2%, 3%, 4%, 5%, 6%, 7%, 8%, 9%, 10%, 12%, 14%, 16%, 18%, 20%, 25%, 30%, 35%, or 40% by weight rubber. In some embodiments, the rubber content of sheet 50 can be selected from a first series of ranges of about 0.5% to about 50%, about 0.5% to about 40%, about 0.5% to about 30%, about 0.5% to about 20%, about 0.5% to about 18%, about 0.5% to about 16%, about 0.5% to about 10%, or about 0.5% to about 5% by weight of the single-layer sheet. In some embodiments, the rubber content of sheet 50 can be selected from a second series of ranges of about 0.5% to about 20%, about 1% to about 20%, about 2% to about 20%, about 2.5% to about 20%, about 2.5% to about 20%, about 3% to about 20%, about 3.5% to about 20%, about 4% to about 20%, about 4.5% to about 20%, about 5% to about 20%, about 6% to about 20%, or about 7% to about 20% by weight of the sheet. In some embodiments, the rubber content of sheet 50 can be selected from a third series of ranges of about 0.5% to about 20%, about 1% to about 20%, about 1.5% to about 20%, about 2% to about 20%, about 2% to about 15%, about 2% to about 10%, about 2% to about 8%, or about 2% to about 5% by weight of the single-layer sheet. In some examples, the rubber content is about 0.5%, about 1%, about 1.5%, about 2%, about 2.5%, about 3%, about 3.5% about 4%, about 4.5% about 5%, about 6%, about 7%, about 7.5%, about 8%, about 8.5%, about 9%, about 9.5%, about 10%, about 12%, about 14%, about 16%, about 18%, about 20%, about 25%, about 30%, about 35%, about 40%, about 45%, or about 50% by weight of the sheet.

The rubber content of sheet 50 and article 10 is believed to be at least one factor in the crazing (whitening) of sheet 50 and article 10 when deformed along stress concentrator features. A relatively low rubber content may be sufficient to provide sheet 50 and article 10 with crazing properties.

In some embodiments, the polypropylene homopolymer has a melt flow as measured by ASTM Method D1238 (230° C., 2.16 kg) of a range of about 1 g/10 min to about 10 g/10 min, about 1 g/10 min to about 5 g/10 min, or about 1 g/10 min to about 4 g/10 min. In some examples, the polypropylene homopolymer has a melt flow as measured by ASTM Method D1238 (230° C., 2.16 kg) of about 1 g/10 min, about 1.5 g/10 min, about 2 g/10 min, about 2.5 g/10 min, about 3 g/10 min, about 3.5 g/10 min, about 4 g/10 min, about 5 g/10 min, about 6 g/10 min, about 7 g/10 min, about 8 g/10 min, or about 10 g/10 min.

In some embodiments, the polypropylene homopolymer has a flexural modular as measured by ASTM Method D790A (0.05 in/min, 1% secant) of a range of about 100,000 psi to about 700,000 psi, about 100,000 psi to about 600,000 psi, about 100,000 psi to about 500,000 psi, or about 200,000 psi to about 500,000 psi. In some examples, the polypropylene homopolymer has a flexural modular as measured by ASTM Method D790A (0.05 in/min, 1% secant) of about 100,000 psi, about 200,000 psi, about 250,000 psi, about 300,000 psi, about 350,000 psi, about 400,000 psi, about 500,000 psi, about 600,000 psi, or about 700,000 psi.

In some embodiments, the polypropylene impact copolymer has a melt flow as measured by ASTM Method D1238 (230° C., 2.16 kg) of a range of about 1 g/10 min to about 10 g/10 min, about 1 g/10 min to about 8 g/10 min, about 2 g/10 min to about 8 g/10 min, or about 2 g/10 min to about 6 g/10 min. In some examples, the polypropylene impact copolymer has a melt flow as measured by ASTM Method D1238 (230° C., 2.16 kg) of about 1 g/10 min, about 2 g/10 min, about 2.5 g/10 min, about 3 g/10 min, about 3.5 g/10 min, about 4 g/10 min, about 4.5 g/10 min, about 5 g/10 min, about 5.5 g/10 min, about 6 g/10 min, about 7 g/10 min, about 8 g/10 min, or about 10 g/10 min.

In some embodiments, the polypropylene impact copolymer has a flexural modular as measured by ASTM Method D790A (0.05 in/min, 1% secant) of a range of about 100,000 psi to about 700,000 psi, about 100,000 psi to about 600,000 psi, about 100,000 psi to about 500,000 psi, or about 200,000 psi to about 500,000 psi. In some examples, the polypropylene impact copolymer has a flexural modular as measured by ASTM Method D790A (0.05 in/min, 1% secant) of about 100,000 psi, 200,000 psi, about 230,000 psi, about 250,000 psi, about 300,000 psi, about 350,000 psi, about 400,000 psi, about 500,000 psi, about 600,000 psi, or about 700,000 psi.

In some embodiments, the polypropylene impact copolymer has a rubber content up to about 50% by weight of the polypropylene impact copolymer. In some embodiments, the polypropylene impact copolymer comprises at least 0.05%, 1%, 2%, 3%, 4%, 5%, 6%, 7%, 8%, 9%, 10%, 12%, 14%, 16%, 18%, 20%, 25%, 30%, 35%, or 40% by weight rubber. In some embodiments, the rubber content of the polypropylene impact copolymer can be selected from a first series of ranges of about 0.5% to about 50%, about 0.5% to about 40%, about 0.5% to about 30%, about 0.5% to about 20%, about 0.5% to about 18%, about 0.5% to about 16%, or about 0.5% to about 10% by weight of the polypropylene impact copolymer. In some embodiments, the rubber content of the polypropylene impact copolymer can be selected from a second series of ranges of about 0.5% to about 30%, about 1% to about 30%, about 3% to about 30%, about 5% to about 30%, about 6% to about 30%, or about 7% to about 30% by weight of the polypropylene impact copolymer. In some embodiments, the rubber content of the polypropylene impact copolymer can be selected from a third series of ranges of about 0.5% to about 30%, about 1% to about 30%, about 1% to about 20%, about 2% to about 20%, about 2% to about 15%, about 3% to about 15%, about 3% to about 10%, or about 5% to about 10% by weight of the polypropylene impact copolymer. In some examples, the rubber content is about 0.5%, about 1%, about 3%, about 4%, about 5%, about 6%, about 7%, about 7.5%, about 8%, about 8.5%, about 9%, about 9.5%, about 10%, about 12%, about 14%, about 16%, about 18%, about 20%, about 25%, about 30%, about 35%, about 40%, about 45%, or about 50% by weight of the polypropylene impact copolymer.

In some embodiments, sheet 50 comprises a polymeric mixture further comprising an additive. Exemplary additives include a copolymer, clarifiers, process aids, slip agents, combinations thereof, or any suitable material for improving the single-layer sheet. In some embodiments, the additive is a clarifier. In some embodiments, the clarifier is a polypropylene random copolymer. In some embodiments, the additive is a copolymer. In some embodiments, the additive is a random copolymer. In some embodiments, the copolymer is an ethylene-polypropylene copolymer. In some embodiments, the copolymer is a random ethylene-polypropylene copolymer. In some embodiments, the sheet comprises Braskem RP650. In some embodiments, the additive is Braskem RP650.

In some embodiments, the additive may be up to about 20% or up to about 10% by weight of the polymeric mixture of the sheet. In some embodiments, the additive may be selected from a range of about 0.5% to about 20%, about 0.5% to about 15%, about 5% to about 15%, about 0.5% to about 10%, about 0.5% to about 5%, about 10% to about 20%, or about 0.5% to about 3% by weight of the sheet. In some embodiments the sheet comprises about 0.5%, about 1%, about 1.5%, about 2%, about 3%, about 4%, about 5%, about 6%, about 8%, about 10%, about 12%, about 14%, about 16%, about 18%, about 20%, about 22%, about 25%, or about 30% by weight of the sheet. In some embodiments, the polymeric mixture of the sheet comprises about 0.5% to about 5% ethylene-propylene copolymer by weight of the sheet. In some embodiments, the polymeric mixture comprises about 0.5% to about 15% ethylene-propylene random copolymer by weight of the sheet. In some embodiments, the polymeric mixture comprises about 5% to about 15% ethylene-propylene random copolymer by weight of the sheet. In some embodiments, the additive may be up to about 100% by weight of the polymeric mixture of the sheet.

In some embodiments, sheet 50 consists of a polymeric mixture comprising a first polypropylene and a second polypropylene in accordance with the present disclosure. In some embodiments, sheet 50 comprises of a polymeric formulation consisting of a first polypropylene, a second polypropylene, and an additive. In some embodiments, sheet 50 comprises a polymeric formulation consisting of a first polypropylene, a second polypropylene, and a random copolymer. In some embodiments, sheet 50 comprises a polymeric formulation consisting of a first polypropylene, a second polypropylene, and an ethylene-propylene copolymer. In some embodiments, sheet 50 comprises a polymeric formulation consisting of a first polypropylene and a second polypropylene.

In some embodiments, sheet 50 consists of a polymeric mixture comprising a base resin and a secondary resin in accordance with the present disclosure. In some embodiments, sheet 50 comprises a polymeric formulation consisting of a base resin, a secondary resin, and an additive. In some embodiments, sheet 50 comprises a polymeric formulation consisting of a base resin, a secondary resin, and a random copolymer. In some embodiments, sheet 50 comprises a polymeric formulation consisting of a base resin, a secondary resin, and an ethylene-propylene copolymer. In some embodiments, sheet 50 comprises a polymeric formulation consisting of a polypropylene homopolymer and a polypropylene impact copolymer. In some embodiments, sheet 50 comprises a polymeric formulation consisting of a polypropylene homopolymer, a polypropylene impact copolymer, and a polypropylene random copolymer.

In some embodiments, sheet 50 consists of a polymeric mixture consisting of a base resin and a secondary resin in accordance with the present disclosure. In some embodiments, sheet 50 consists of a polymeric formulation consisting of a base resin, a secondary resin, and an additive. In some embodiments, sheet 50 consists of a polymeric formulation consisting of a base resin, a secondary resin, and a random copolymer. In some embodiments, sheet 50 consists of a polymeric formulation consisting of a base resin, a secondary resin, and an ethylene-propylene copolymer. In some embodiments, sheet 50 consists of a polymeric formulation consisting of a polypropylene homopolymer and a polypropylene impact copolymer. In some embodiments, sheet 50 consists of a polymeric formulation consisting of a polypropylene homopolymer, a polypropylene impact copolymer, and a polypropylene random copolymer.

The following numbered clauses include embodiments that are contemplated and non-limiting:

Clause 1. A sheet made of polymeric materials, the sheet comprising a polypropylene base resin that comprises rubber.

Clause 2. The sheet of clause 1, any other suitable clause, or suitable combination of clauses, wherein the sheet has a first transparency defined at least by a clarity between about 35% and about 95% as measured using ASTM D 1746.

Clause 3. The sheet of clause 2, any other suitable clause, or suitable combination of clauses, wherein the sheet has a haze between about 10% and about 50% as measured using ASTM D 1003 procedure B.

Clause 4. The sheet of clause 3, any other suitable clause, or suitable combination of clauses, wherein the polypropylene base resin comprises a polypropylene impact copolymer.

Clause 5. The sheet of clause 3, any other suitable clause, or suitable combination of clauses, further comprising a polypropylene homopolymer secondary resin.

Clause 6. The sheet of clause 5, any other suitable clause, or suitable combination of clauses, any other suitable clause, or suitable combination of clauses, wherein the sheet comprises about 50% to about 80% by weight the base resin.

Clause 7. The sheet of clause 6, any other suitable clause, or suitable combination of clauses, wherein the sheet comprises about 20% to about 50% by weight the secondary resin.

Clause 8. The sheet of clause 6, any other suitable clause, or suitable combination of clauses, wherein the sheet comprises about 20% to about 40% by weight the secondary resin.

Clause 9. The sheet of clause 3, any other suitable clause, or suitable combination of clauses, wherein a predetermined portion of the sheet is arranged to move from a first arrangement in which the predetermined portion has the first transparency to a second arrangement in which the predetermined portion has a second transparency that is different than the first transparency.

Clause 10. The sheet of clause 3, any other suitable clause, or suitable combination of clauses, wherein the clarity of the sheet is between about 50% and about 95% as measured using ASTM D 1746 and the haze is between about 20% and about 40% as measured using ASTM D 1003 procedure B.

Clause 11. The sheet of clause 3, any other suitable clause, or suitable combination of clauses, wherein the sheet comprises about 55% to about 75% by weight the base resin.

Clause 12. The sheet of clause 11, any other suitable clause, or suitable combination of clauses, wherein the sheet comprises about 20% to about 40% by weight the secondary resin.

Clause 13. The sheet of clause 12, any other suitable clause, or suitable combination of clauses, wherein the sheet comprises about 5% to about 25% by weight a tertiary resin.

Clause 14. The sheet of clause 3, any other suitable clause, or suitable combination of clauses, wherein the sheet comprises about 65% by weight the base resin.

Clause 15. The sheet of clause 14, any other suitable clause, or suitable combination of clauses, wherein the sheet comprises about 35% by weight the secondary resin.

Clause 16. The sheet of clause 3, any other suitable clause, or suitable combination of clauses, wherein the sheet is free of polystyrene.

Clause 17. An article made of polymeric materials, the article comprising a polypropylene base resin that comprises rubber.

Clause 18. The article of clause 17, any other suitable clause, or suitable combination of clauses, wherein the article has a first transparency defined at least by a clarity between about 35% and about 95% as measured using ASTM D 1746.

Clause 19. The article of clause 18, any other suitable clause, or suitable combination of clauses, wherein the article has a haze between about 10% and about 50% as measured using ASTM D 1003 procedure B.

Clause 20. The article of clause 19, any other suitable clause, or suitable combination of clauses, wherein the polypropylene base resin comprises a polypropylene impact copolymer.

Clause 21. The article of clause 19, any other suitable clause, or suitable combination of clauses, wherein the article comprises at least about 45% by weight the polypropylene base resin.

Clause 22. The article of clause 19, any other suitable clause, or suitable combination of clauses, further comprising a polypropylene homopolymer secondary resin.

Clause 23. The article of clause 22, any other suitable clause, or suitable combination of clauses, wherein the article comprises about 50% to about 80% by weight the base resin.

Clause 24. The article of clause 23, any other suitable clause, or suitable combination of clauses, wherein the article comprises about 20% to about 50% by weight the secondary resin.

Clause 25. The article of clause 23, any other suitable clause, or suitable combination of clauses, wherein the article comprises about 20% to about 40% by weight the secondary resin.

Clause 26. The article of clause 19, any other suitable clause, or suitable combination of clauses, wherein a deformable feature of the article is arranged to move from a first arrangement in which the deformable feature has the first transparency to a second arrangement in which the deformable feature has a second transparency that is different than the first transparency.

Clause 27. The article of clause 26, any other suitable clause, or suitable combination of clauses, wherein the percent of weight of the polypropylene base resin is such that the deformable feature moves from the first arrangement to the second arrangement without fracturing at a temperature of about 55 degrees Fahrenheit or less.

Clause 28. The article of clause 19, any other suitable clause, or suitable combination of clauses, wherein the clarity of the article is between about 50% and about 95% as measured using ASTM D 1746 and the haze is between about 20% and about 40% as measured using ASTM D 1003 procedure B.

Clause 29. The article of clause 22, any other suitable clause, or suitable combination of clauses, wherein the article comprises about 55% to about 75% by weight the base resin.

Clause 30. The article of clause 29, any other suitable clause, or suitable combination of clauses, wherein the article comprises about 20% to about 40% by weight the secondary resin.

Clause 31. The article of clause 30, any other suitable clause, or suitable combination of clauses, wherein the article comprises about 5% to about 25% by weight a tertiary resin.

Clause 32. The article of clause 19, any other suitable clause, or suitable combination of clauses, wherein the article comprises about 65% by weight the base resin.

Clause 33. The article of clause 32, any other suitable clause, or suitable combination of clauses, wherein the article comprises about 35% by weight the secondary resin.

Clause 34. The article of clause 25, any other suitable clause, or suitable combination of clauses, wherein the article comprises one of a bowl, plate, tray, lid, container, and film.

Clause 35. The article of clause 25, any other suitable clause, or suitable combination of clauses, wherein the article is formed using a shallow draw thermoforming process.

Clause 36. The article of clause 25, any other suitable clause, or suitable combination of clauses, wherein the article comprises about 1% to about 20% by weight rubber.

Clause 37. A lid comprising a brim mount adapted to couple to a container.

Clause 38. The lid of clause 37, any other suitable clause, or suitable combination of clauses, further comprising a closure coupled to the brim mount and adapted to at least partway close an aperture opening into the container.

Clause 39. The lid of clause 38, any other suitable clause, or suitable combination of clauses, wherein the lid comprises at least 40% by weight polypropylene.

Clause 40. The lid of clause 39, any other suitable clause, or suitable combination of clauses, wherein a portion of the lid is arranged to move from a first arrangement in which the portion has a first transparency to a second arrangement in which the portion has a second transparency.

Clause 41. The lid of clause 40, any other suitable clause, or suitable combination of clauses, wherein the second transparency is different than the first transparency.

Clause 42. The lid of clause 41, any other suitable clause, or suitable combination of clauses, wherein the first transparency is defined at least by having a clarity between about 20% and about 95% as measured using ASTM D 1746 and a haze between about 5% and about 50% as measured using ASTM D 1003 procedure B.

Clause 43. The lid of clause 41, any other suitable clause, or suitable combination of clauses, wherein the lid comprises a polypropylene impact copolymer base resin.

Clause 44. The lid of clause 43, any other suitable clause, or suitable combination of clauses, wherein the lid comprises about 50% to about 80% by weight the base resin.

Clause 45. The lid of clause 44, any other suitable clause, or suitable combination of clauses, wherein the lid comprises about 65% to about 75% by weight the base resin.

Clause 46. The lid of clause 43, any other suitable clause, or suitable combination of clauses, wherein the lid comprises a polypropylene homopolymer secondary resin Clause 47. The lid of clause 46, any other suitable clause, or suitable combination of clauses, wherein the lid comprises about 35% by weight the secondary resin.

Clause 48. The lid of clause 43, any other suitable clause, or suitable combination of clauses, wherein the clarity of the lid is between about 60% and about 70% as measured using ASTM D 1746 and the haze of the lid is between about 30% and about 40% as measured using ASTM D 1003 procedure B.

EXAMPLES

The following examples are set forth for purposes of illustration only. Parts and percentages appearing in such examples are by weight unless otherwise stipulated. All ASTM, ISO, and other standard test methods cited or referred to in this disclosure are incorporated by reference in their entirety.

Example 1

Formulation and Extrusion

An exemplary single-layer sheet in accordance with certain aspects of the present disclosure is provided in the instant example. The sheet in this example is a single-layer sheet.

A polymeric mixture comprised a polypropylene homopolymer, a polypropylene impact copolymer, and a polypropylene random copolymer. The polypropylene homopolymer was Braskem INSPIRE™ 6025N. The polypropylene impact copolymer was LyondellBassell Pro-fax™ SC204. The clarifier was Braskem RP650. The percentages by weight of the components were about:

| | |
|---|---|
| 50% | Braskem INSPIRE ™ 6025N |
| 49% | LyondellBassell Pro-fax ™ SC204 |
| 1% | Braskem RP650 |

The polypropylene homopolymer, the polypropylene impact copolymer, and the polypropylene random copolymer were added to an extruder hopper and combined via blending to provide a formulation. The formulation was then heated in the extruder to form a molten material. The molten material was extruded to form a single-layer sheet. The single-layer sheet was thermoformed to form a lid in accordance with the present disclosure.

Example 2

Formulation and Extrusion

An exemplary single-layer sheet in accordance with certain aspects of the present disclosure is provided in the instant example. The sheet in this example is a single-layer sheet.

A polymeric mixture comprised a polypropylene homopolymer and a polypropylene impact copolymer. The polypropylene homopolymer was Braskem INSPIRE™ 6025N. The polypropylene impact copolymer was Lyondell-Bassell Pro-fax™ SC204. The percentages by weight of the components were about:

| | |
|---|---|
| 50% | Braskem INSPIRE ™ 6025N |
| 50% | LyondellBassell Pro-fax ™ SC204 |

The polypropylene homopolymer and the polypropylene impact copolymer were added to an extruder hopper and combined via blending to provide a formulation. The formulation was then heated in the extruder to form a molten material. The molten material was extruded to form a single-layer sheet. The single-layer sheet was thermoformed to form a lid in accordance with the present disclosure.

Example 3

Formulation and Extrusion

An exemplary single-layer sheet in accordance with certain aspects of the present disclosure is provided in the instant example. The sheet in this example is a single-layer sheet.

A polymeric mixture comprised a polypropylene homopolymer, a polypropylene impact copolymer, and a polypropylene random copolymer. The polypropylene homopolymer was Braskem INSPIRE™ 6025N. The polypropylene impact copolymer was LyondellBassell Pro-fax™ SC204. The clarifier was Braskem RP650. The percentages by weight of the components were about:

| | |
|---|---|
| 35% | Braskem INSPIRE ™ 6025N |
| 55% | LyondellBassell Pro-fax ™ SC204 |
| 10% | Braskem RP650 |

The polypropylene homopolymer, the polypropylene impact copolymer, and the polypropylene random copolymer were added to an extruder hopper and combined via blending to provide a formulation. The formulation was then heated in the extruder to form a molten material. The molten material was extruded to form a single-layer sheet. The single-layer sheet was thermoformed to form a lid in accordance with the present disclosure.

Example 4

Formulation and Extrusion

An exemplary single-layer sheet in accordance with certain aspects of the present disclosure is provided in the instant example. The sheet in this example is a single-layer sheet.

A polymeric mixture comprised a polypropylene impact copolymer and a polypropylene homopolymer. The polypropylene impact copolymer was LyondellBassell Pro-fax™ SC204. The polypropylene homopolymer was Braskem INSPIRE™ 6025N. The percentages by weight of the components were about:

| | |
|---|---|
| 65% | LyondellBassell Pro-fax ™ SC204 |
| 35% | Braskem INSPIRE ™ 6025N |

The polypropylene impact copolymer and the polypropylene homopolymer were added to an extruder hopper and combined via blending to provide a formulation. The formulation was then heated in the extruder to form a molten material. The molten material was extruded to form a single-layer sheet. The single-layer sheet was thermoformed to form a lid in accordance with the present disclosure.

Example 5

Formulation and Extrusion

An exemplary single-layer sheet in accordance with certain aspects of the present disclosure is provided in the instant example. The sheet in this example is a single-layer sheet.

A polymeric mixture comprised a polypropylene impact copolymer and a polypropylene homopolymer. The polypropylene impact copolymer was LyondellBassell Pro-fax™ SC204. The polypropylene homopolymer was Braskem INSPIRE™ 6025N. The percentages by weight of the components were about:

| | |
|---|---|
| 75% | LyondellBassell Pro-fax ™ SC204 |
| 25% | Braskem INSPIRE ™ 6025N |

The polypropylene impact copolymer and the polypropylene homopolymer were added to an extruder hopper and combined via blending to provide a formulation. The formulation was then heated in the extruder to form a molten material. The molten material was extruded to form a single-layer sheet. The single-layer sheet was thermoformed to form a lid in accordance with the present disclosure.

Example 6

Formulation and Extrusion

An exemplary single-layer sheet in accordance with certain aspects of the present disclosure is provided in the instant example. The sheet in this example is a single-layer sheet.

A polymeric mixture comprised a polypropylene impact copolymer, a polypropylene homopolymer, and a polypropylene random copolymer. The polypropylene impact copolymer was LyondellBassell Pro-fax™ SC204. The polypropylene homopolymer was Braskem INSPIRE™ 6025N. The clarifier was Braskem RP650. The percentages by weight of the components were about:

| | |
|---|---|
| 55% | LyondellBassell Pro-fax ™ SC204 |
| 25% | Braskem INSPIRE ™ 6025N |
| 20% | Braskem RP650 |

The polypropylene impact copolymer, the polypropylene homopolymer, and the polypropylene random copolymer were added to an extruder hopper and combined via blending to provide a formulation. The formulation was then heated in the extruder to form a molten material. The molten material was extruded to form a single-layer sheet. The single-layer sheet was thermoformed to form a lid in accordance with the present disclosure.

Example 7

Formulation and Extrusion

An exemplary single-layer sheet in accordance with certain aspects of the present disclosure is provided in the instant example. The sheet in this example is a single-layer sheet.

A polymeric mixture comprised a polypropylene impact copolymer. The polypropylene impact copolymer was LyondellBassell Pro-fax™ SC204. The percentages by weight of the components were about:

100% LyondellBassell Pro-fax™ SC204

The polypropylene impact copolymer was added to an extruder hopper to provide a formulation. The formulation was then heated in the extruder to form a molten material. The molten material was extruded to form a single-layer sheet. The single-layer sheet was thermoformed to form a lid in accordance with the present disclosure.

Articles 10 may be used in cold or refrigerated environments such as in cold climates or may be used soon after being stored in a cold storage location. Edges and features of articles 10 such as information features 16, 216, 316, 416, 516, 616, 816, 916, 1016 of the present disclosure may resist cracking due to being deformed to cause crazing when cold.

In some embodiments, formulas having at least about 40% by weight polypropylene impact copolymer reduce or eliminate cracking of the edges of articles 10 when articles 10 have a temperature of about 55 degrees Fahrenheit or less and are deformed to cause crazing. In some embodiments, formulas having at least about 50% by weight polypropylene impact copolymer reduce or eliminate cracking of the edges of articles 10 when articles 10 have a temperature of about 55 degrees Fahrenheit or less and are deformed to cause crazing. In some embodiments, formulas having at least about 55% by weight polypropylene impact copolymer reduce or eliminate cracking of the edges of articles 10 when articles 10 have a temperature of about 55 degrees Fahrenheit or less and are deformed to cause crazing.

Figure 20:
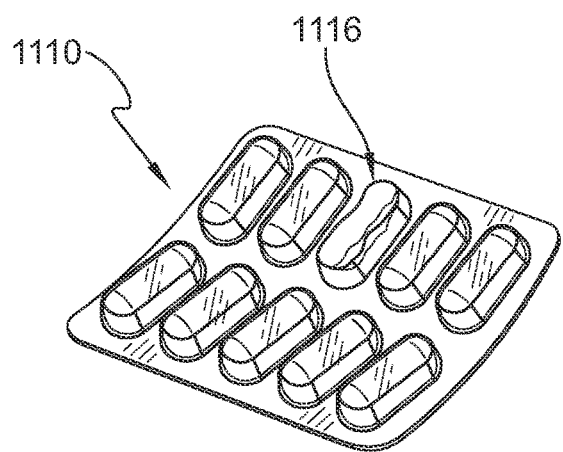
FIG. 20 is a perspective view of a second exemplarily embodiment of an article in accordance with the present disclosure showing that the article is a pill container.
Figure 21:
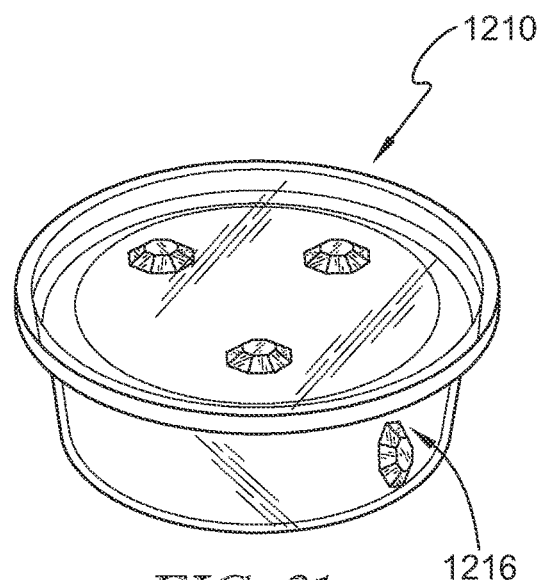
FIG. 21 is a perspective view of a third exemplarily embodiment of an article in accordance with the present disclosure showing that the article is a cylindrical container having a plurality of deformable information features formed therein adapted to change transparency when deformed.
Figure 22:
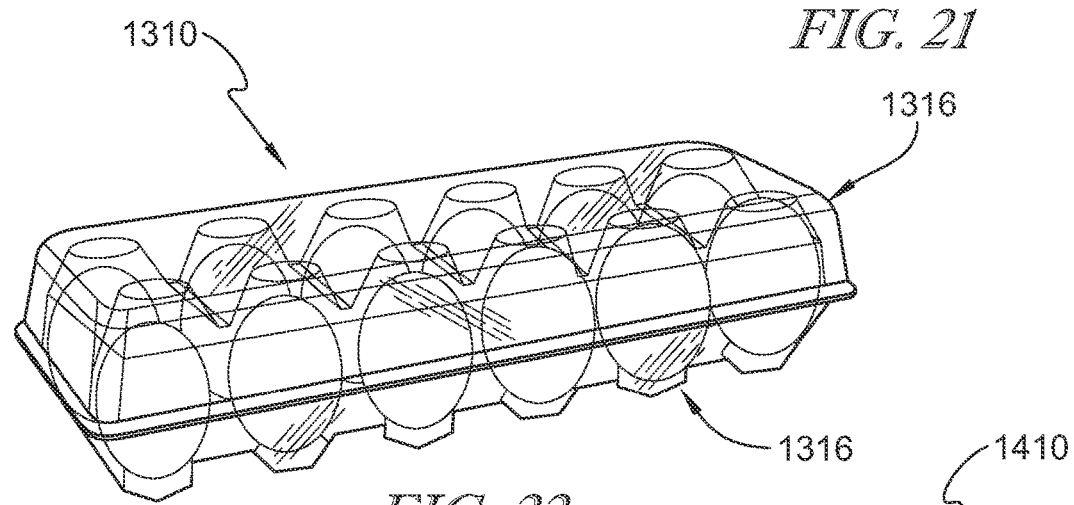
FIG. 22 is a perspective view of a fourth exemplarily embodiment of an article in accordance with the present disclosure showing that the article is an egg carton.
Figure 23:
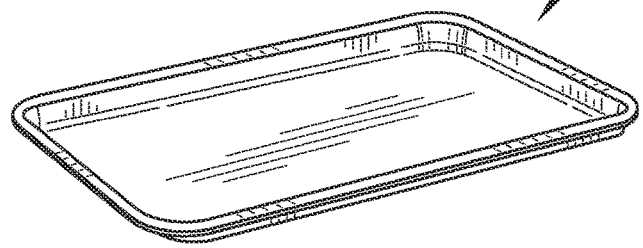
FIG. 23 is a perspective view of a fifth exemplarily embodiment of an article in accordance with the present disclosure showing that the article is a tray.

An exemplary embodiment of article 10 as a pill container 1110 is shown in FIG. 20. Pill container 1110 includes a plurality of deformable features 1116 to provide pill retainer means configured to change transparency when deformed. An exemplary embodiment of article 10 as a container 1210 is shown in FIG. 21. The container 1210 includes information features 1216 that protrude outward and additionally features such as the brim or other edges may craze in response to deformation. An exemplary embodiment of article 10 as an egg carton 1310 is shown in FIG. 22. The egg carton 1310 includes damage identification features 1316 such as edges or protrusions that craze in response to deformation to indicate that the egg carton 1310 may have sustained an impact force. An exemplary embodiment of article 10 as a tray 1410 is shown in FIG. 23.

Figure 24:
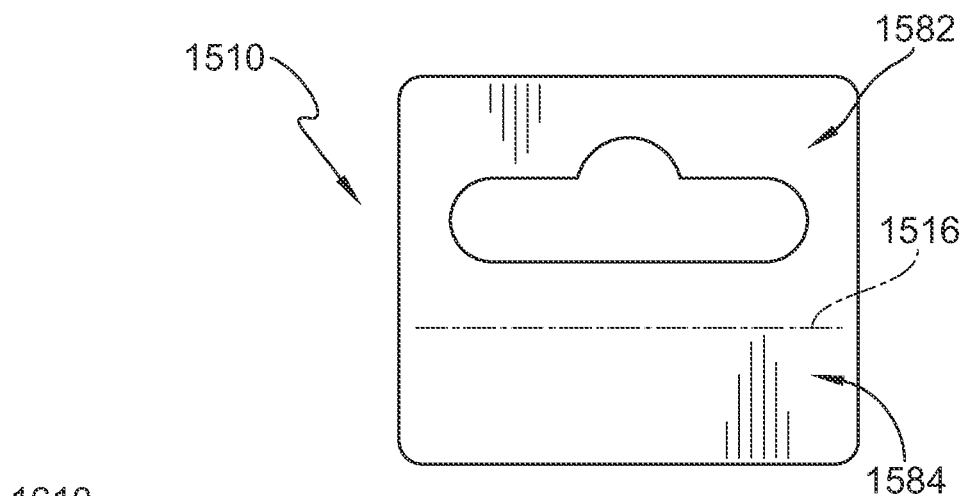
FIG. 24 is a perspective view of a sixth exemplarily embodiment of an article in accordance with the present disclosure showing that the article is a panel that includes a tab movable about a living hinge configured to change in transparency when deformed.
Figure 25:
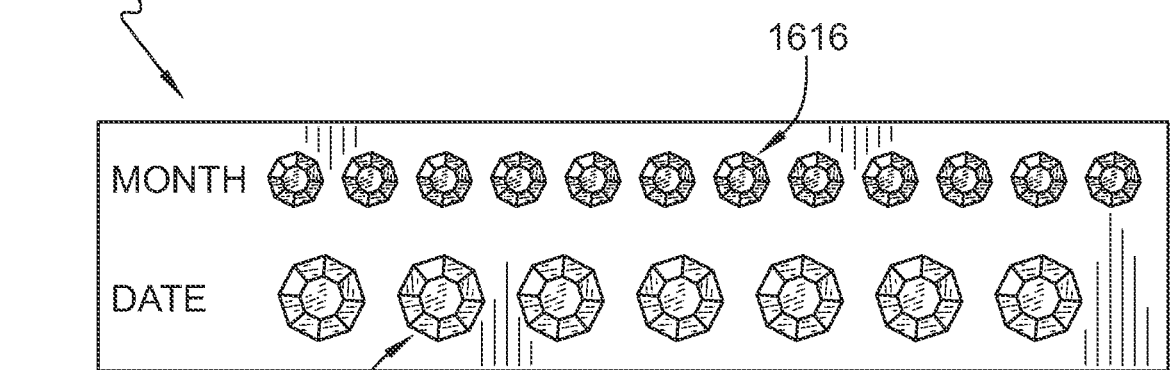
FIG. 25 is a perspective view of a seventh exemplarily embodiment of an article in accordance with the present disclosure showing that the article is a date indicator having deformable information features configured to change in transparency when deformed.
Figure 26:
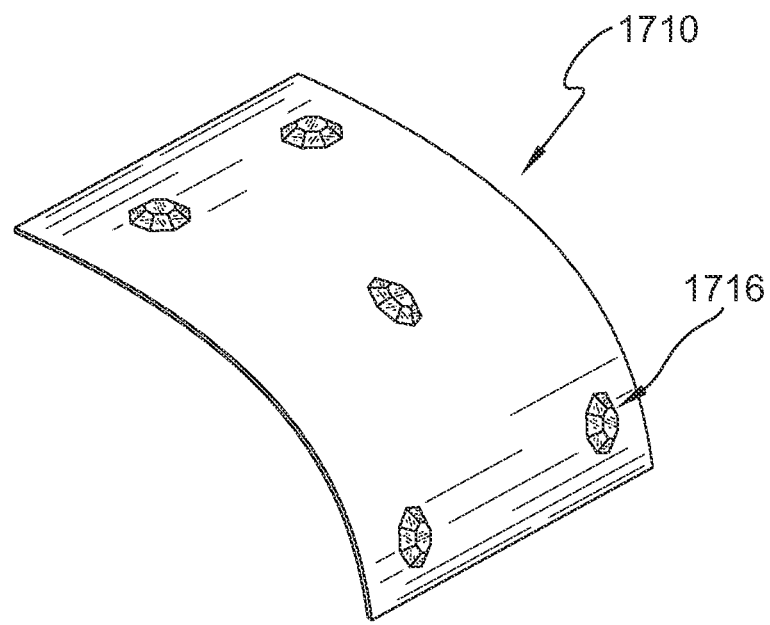
FIG. 26 is a perspective view of an eighth exemplarily embodiment of an article in accordance with the present disclosure showing that the article is a packing wrap having deformable damage indicator features configured to change in transparency if deformed.

An exemplary embodiment of article 10 as a panel 1510 is shown in FIG. 24. The panel 1510 includes a first tab 1582 coupled to a second tab 1584 about a living hinge 1516 that is configured to craze in response to being bent and deformed. An exemplary embodiment of article 10 as a date indicator 1610 is shown in FIG. 25. A use by or produced on date may be selected by deforming information features 1616 corresponding with a given month, year, day, date, day of the week, etc. An exemplary embodiment of article 10 as package indication wrap 1710 is shown in FIG. 26. The wrap 1710 may be deformable to wrap around itself, semi-rigid, or rigid and includes deformable indicator features 1716 that craze when deformed to indicate that the wrap 1710 and, thus, the object the wrap 1710 surrounds, may have been subject to an impact force or other force that could damage the object.

Illustratively, article 10 is a shallow draw article formed with a shallow draw process such as rotary thermoforming or flatbed thermoforming. In other embodiments, article 10 is formed with another process such as a deep draw process, blow molding process, or casting process for example.

The invention claimed is:

1. An article made of polymeric materials, the article comprising
   a polypropylene base resin,
      wherein a portion of the article is arranged to move from a first arrangement in which the portion has a first transparency to a second arrangement in which the portion has a second transparency that is different than the first transparency in response to a first deformation force being applied to the portion,
      wherein the first transparency is defined at least by a haze between about 10% and about 50% as measured using ASTM D 1003 procedure B, and a haze of the second transparency is different than the haze of the first transparency so that the portion is at least partially opaque in response to being in the second arrangement,
wherein the portion is arranged to move from the second arrangement to a third arrangement in response to a second deformation force, the portion has a third transparency in the third arrangement, and the third transparency is different than the second transparency, wherein the haze of the portion in the second arrangement is greater than the haze of the portion in the first arrangement and the third arrangement.

2. The article of claim 1, wherein the portion of the article is formed to define stress concentrator joints that focus stresses in the portion to cause the first transparency of the portion of the article to change in response to the portion moving from the first arrangement to the second arrangement.

3. The article of claim 2, wherein the portion of the article includes a cap spaced apart from a body of the article and a plurality of panels that each extend between and interconnect the cap and the body, the plurality of panels are arranged to surround the cap and adjacent panels are coupled to one another to form the stress concentrator joints.

4. The article of claim 3, wherein the cap is coupled to the plurality of panels along a first curved edge.

5. The article of claim 4, wherein the cap includes an upper surface, a lower surface, and a side surface that extends between and interconnects the upper surface and the lower surface, the lower surface couples to the plurality of panels at the first curved edge, and the side surface couples to the upper surface at a second curved edge.

6. The article of claim 3, wherein the adjacent panels of the plurality of panels are coupled to one another along linear geometries to form the stress concentrator joints.

7. The article of claim 2, wherein the polypropylene base resin comprises a polypropylene impact copolymer.

8. The article of claim 7, wherein the article further comprises a polypropylene homopolymer secondary resin.

9. The article of claim 2, wherein the article comprises about 1% to about 20% by weight rubber.

10. An article made of polymeric materials, the article comprising
a polypropylene impact copolymer base resin,
wherein a portion of the article is arranged to move from a first arrangement in which the portion has a first transparency to a second arrangement in which the portion has a second transparency that is different than the first transparency in response to a first deformation force being applied to the portion,
wherein the portion is arranged to move from the second arrangement to a third arrangement in response to a second deformation force, the portion has a third transparency in the third arrangement, and the third transparency is different than the second transparency, wherein the haze of the portion in the second arrangement is greater than the haze of the portion in the first arrangement and the third arrangement.

11. The article of claim 10, wherein the first transparency is defined at least by a haze between about 10% and about 50% as measured using ASTM D 1003 procedure B, and a haze of the second transparency is greater than the haze of the first transparency so that the portion is at least partially opaque in response to being in the second arrangement.

12. The article of claim 11, wherein the portion of the article is formed to define stress concentrator joints that focus stresses in the portion to cause the first transparency of the portion of the article to change in response to the portion moving from the first arrangement to the second arrangement.

13. The article of claim 12, wherein the portion of the article includes a cap spaced apart from a body of the article and a plurality of panels that each extend between and interconnect the cap and the body, the plurality of panels are arranged to surround the cap and adjacent panels are coupled to one another to form the stress concentrator joints.

14. The article of claim 13, wherein the cap is coupled to the plurality of panels along a first curved edge.

15. The article of claim 14, wherein the cap includes an upper surface, a lower surface, and a side surface that extends between and interconnects the upper surface and the lower surface, the lower surface couples to the plurality of panels at the first curved edge, and the side surface couples to the upper surface at a second curved edge.

16. The article of claim 13, wherein the adjacent panels of the plurality of panels are coupled to one another along linear geometries to form the stress concentrator joints.

17. The article of claim 12, wherein the article comprises a polypropylene homopolymer secondary resin.

18. The article of claim 17, wherein the article comprises about 50% to about 80% by weight the base resin and about 20% to about 40% by weight the secondary resin.

* * * * *